United States Patent
Kujirai et al.

(10) Patent No.: US 7,609,401 B2
(45) Date of Patent: Oct. 27, 2009

(54) INFORMATION PROCESSING APPARATUS AND METHOD UTILIZING PRINT PREVIEWS, AND COMPUTER-READABLE STORAGE MEDIUM

(75) Inventors: Yasuhiro Kujirai, Tokyo (JP); Koji Nakagiri, Kanagawa (JP); Satoshi Nishikawa, Kanagawa (JP); Yasuo Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 829 days.

(21) Appl. No.: 11/123,138

(22) Filed: May 6, 2005

(65) Prior Publication Data

US 2005/0206953 A1    Sep. 22, 2005

Related U.S. Application Data

(63) Continuation of application No. 09/595,885, filed on Jun. 20, 2000, now Pat. No. 6,927,865.

(30) Foreign Application Priority Data

Jun. 23, 1999  (JP) ............................. 1999-176739
Nov. 2, 1999   (JP) ............................. 1999-312627

(51) Int. Cl.
*G06F 15/00* (2006.01)
*G06F 3/12* (2006.01)

(52) U.S. Cl. .................................... 358/1.13; 358/1.12

(58) Field of Classification Search ................ 358/1.2, 358/1.9, 1.13, 1.15, 527; 709/526, 527, 522; 715/274, 528, 530, 835, 839; 707/523, 527, 707/526, 537

See application file for complete search history.

(56) References Cited

U.S. PATENT DOCUMENTS

| 5,045,967 | A | | 9/1991 | Igarashi ...................... 364/518 |
|---|---|---|---|---|
| 5,098,302 | A | * | 3/1992 | Sekiguchi ................... 434/426 |
| 5,699,494 | A | | 12/1997 | Colbert et al. .............. 395/114 |
| 5,943,679 | A | * | 8/1999 | Niles et al. ................... 715/247 |
| 5,963,216 | A | | 10/1999 | Chiarabini et al. |
| 6,108,008 | A | | 8/2000 | Ohta .......................... 345/431 |
| 6,134,568 | A | | 10/2000 | Tonkin ....................... 707/526 |
| 6,577,330 | B1 | * | 6/2003 | Tsuda et al. ................. 715/782 |
| 6,614,454 | B1 | | 9/2003 | Livingston .................. 345/781 |
| 6,615,346 | B1 | | 9/2003 | Kawamoto ................... 713/100 |
| 6,661,530 | B1 | * | 12/2003 | Munetomo et al. ......... 358/1.15 |
| 6,927,865 | B1 | * | 8/2005 | Kujirai et al. .............. 358/1.12 |

FOREIGN PATENT DOCUMENTS

| EP | 0 803 795 A1 | 10/1997 |
|---|---|---|
| EP | 0 803 795 B1 | 3/2002 |
| JP | 9-185605 | 7/1997 |
| JP | 10-40045 | 2/1998 |
| JP | 10-177463 | 6/1998 |
| JP | 10-269048 | 10/1998 |
| JP | 11-143664 | 5/1999 |

OTHER PUBLICATIONS

Office Action, dated Aug. 19, 2008, in JP 2007-133887.

* cited by examiner

*Primary Examiner*—Gabriel I Garcia
(74) *Attorney, Agent, or Firm*—Fitzpatrick, Cella, Harper & Scinto

(57) ABSTRACT

Defect-free printing is achieved by previewing on a display prior to printing, device functions and print specifications. Preview of double-sided faces is concurrently provided when double-sided printing is specified. Display is performed by generation of data which allows print preview that reflects consideration of device information and document data. Data is generated for perspective-reverse-face preview when page-specification information is set for double-sided faces.

22 Claims, 32 Drawing Sheets

FIG. 10

| JOB-IDENTIFIABLE ID |
|---|
| PHYSICAL PAGE NUMBER FOR THIS PRINT PAGE |
| THE NUMBER n OF PHYSICAL PAGE, WHICH IS ALLOCATED FOR PHYSICAL PAGES |
| THE FIRST PHYSICAL PAGE NUMBER |
| ⋮ |
| THE n-TH PHYSICAL PAGE NUMBER |
| TOTAL NUMBER OF PAGES PER SHEET FOR THIS JOB |

FIG. 12

| FLAG FOR SETTING DOUBLE-SIDES PRINTING |
| --- |
| FORM SIZE |
| VALID PRINTING AREA X |
| VALID PRINTING AREA Y |
| FLAG FOR PREVIEWING OR NOT PREVIEWING |
| THE NUMBER OF PHYSICAL PAGES TO BE ARRANGED IN ONE PHYSICAL PAGE |
| OTHER SETTINGS |

FIG. 13

| |
|---|
| FLAG FOR PUNCHED HOLES OR NO PUNCHED HOLES |
| FLAG FOR STAPLING OR NOT STAPLING |
| INFORMATION ON PUNCHED-HOLE POSITIONS |
| INFORMATION ON PUNCHED-HOLE SIZES |
| : |
| INFORMATION ON STAPLING POSITIONS |
| INFORMATION ON STAPLE SIZE |
| OTHER DEVICE-SETTINGS |

FIG. 19

|  | PERSPECTIVE PREVIEW FOR REVERSE FACE : ON | PERSPECTIVE PREVIEW FOR REVERSE FACE : OFF |
|---|---|---|
| ODD PAGE TO BE OBVERSE FACE : ON | FIG. 18D | FIG. 18B |
| ODD PAGE TO BE OBVERSE FACE : OFF | FIG. 18E | FIG. 18C |

FIG. 29

JOB EDIT

JOB NAME: JOB1.DOC — 2901

NUMBER OF SHEETS : 8

| JOB1-1 | JOB1-2 | JOB1-3 | JOB1-4 | JOB1-5 | JOB1-6 |
|---|---|---|---|---|---|
| 1 | 2 | 3 | 4 | 5 | 6 |

2902

DELETE PAGE — 2903
PREVIEW — 2904

OBJECT-JOB LIST | SETTINGS FOR PRINTING

NO. OF COPIES (C) : 1   COPIES (1 ~ 255)
PRINTING METHOD : SINGLE-SIDE PRINTING ▼ — 2905

☐ STAPLE
☐ INNER BINDING (I)

☑ UNIFORMED LAYOUT
PAGE LAYOUT (L) : 1 PAGE / SHEET ▼ — 2906
PLACEMENT ORDER (X) : ▼

☐ STEALING SETTINGS :

DETAILED SETTINGS... — 2907

RETURN TO ORIGINAL STATE    OK    CANCEL    HELP

FIG. 30

JOB EDIT

LINKED JOB NAME. JOB1.DOC

NUMBER OF SHEETS : 4

| JOB1-1 | JOB1-2 | JOB1-3 | JOB1-4 | JOB1-5 | JOB1-6 |
|---|---|---|---|---|---|
| 1 | | 2 | | 3 | |

DELETE PAGE

PREVIEW

OBJECT-JOB LIST | SETTINGS FOR PRINTING

NO. OF COPIES (C) : 1 COPIES (1 ~ 255)
PRINTING METHOD : DOUBLE-SIDES PRINTING

☐ STAPLE
☐ INNER BINDING (I)

☑ UNIFORMED LAYOUT
PAGE LAYOUT (L) : 1 PAGE / SHEET
PLACEMENT ORDER (X) :

☐ STEALING SETTINGS :

RETURN TO ORIGINAL STATE

DETAILED SETTINGS...

OK  CANCEL  HELP

INFORMATION PROCESSING APPARATUS AND METHOD UTILIZING PRINT PREVIEWS, AND COMPUTER-READABLE STORAGE MEDIUM

This application is a continuation application of U.S. application Ser. No. 09/595,885, filed Jun. 20, 2000, now U.S. Pat. No. 6,927,865, which is incorporated herein by reference.

BACKGROUND OF THE INVENTION

1. Field of the Invention

The present invention relates to an information-processing apparatus such as a personal computer, a control method therefore, and a storage medium containing programs. Particularly, the invention relates to an information-processing apparatus, a control method therefore, and a computer-readable storage medium containing programs that display previews reflecting print results according to print-data when printing is instructed.

2. Description of the Related Art

Printers having device functions for finishing, for example, a stapling function and a punching function, are known. With these printers, printing can be performed by using the device functions according to printing instructions issued from a personal computer.

Also, printers having device functions such as a double-sided printing function that allow printing on double sides of paper forms are known.

Also, in recent years, applications and printer drivers are used by which an operator can determine how print-data is printed by performing previewing when requesting printing through a client application.

However, as represented by stapling and punching functions, since there are no systems that allows previewing of finishing functions of a device (printer), precise print outputs cannot as yet be previewed. Therefore, when print preview is performed, an operator can determine print positions of print-data; however, even when finishing functions of the device are used, the print results cannot be determined in advance. This causes problems such that holes are punched in positions where the print-data is printed, and printing not desired by the operator is performed.

In addition, for defects that would be caused in print results, there are no methods that provide warnings before defective prints are outputted.

In addition, conventional preview functions are for preview of logical pages. In this case, various problems are caused. For example, even when double-sided printing is requested in a required procedure, previews different from the requested double-sided printing are displayed. Also, for example, when a request is made for Nup printing that allows rendering data for multiple pages to be reduction-printed on one page of print form, previews of logical pages are displayed, but previews of actual prints in the print form are not displayed.

SUMMARY OF THE INVENTION

The present invention is made in view of the described related art. Accordingly, it is an object of the present invention to provide defect-free printed results by allowing device functions and print specifications to be previewed.

Another object of the invention is to provide a system configuration that allows previews of physical pages to be displayed and that allows previews of double-side faces of the form to be displayed when either double-sided printing or Nup printing is requested through a printer driver.

To achieve the aforementioned objects, according to one aspect of the present invention, an information-processing apparatus for displaying and controlling print previews of document data inputted from an application comprises a data-generating means for generating rendering data reflecting considerations for device information regarding a printer according to the document data and the device information; and a displaying-and-controlling means for controlling to allow displaying means to display previews of the document data, which reflects considerations for the device information regarding the printer, according to the generated rendering data.

Furthermore, according to another aspect of the present invention, an information-processing apparatus for controlling preview display of document data generated by an application comprises data-generating means for obtaining page-specification information for the document data to generate perspective-reverse-face rendering data when the page-specification information is a double-side-faces specification, and displaying-and-controlling means for performing control so that displaying means displays a perspective-reverse-face preview of the document data according to the generated perspective-reverse-face rendering data.

Other features and advantages of the present invention will become apparent from the following description of the preferred embodiments with reference to the accompanying drawings, in which like reference characters designate the same or similar parts throughout the figures thereof.

BRIEF DESCRIPTION OF THE DRAWINGS

FIG. 10 shows an example data format to be passed when a print request is issued to the despooler from the spool-file manager;

FIG. 12 shows an example case where print specifications are stored in the spool file;

FIG. 13 shows example device information that is sent from the printer driver;

FIG. 19 is a table showing relationships between options, as shown in FIGS. 18A to 18E when all-page display is turned OFF;

FIG. 29 shows a job-edit screen displayed when a job for an intermediate file stored in the spool file is edited;

FIG. 30 shows a view used to explain small previews in double-sided printing on the job-edit screen;

FIG. 31 shows a view used to explain small previews displayed when a page layout is modified on the job-edit screen; and FIG. 32 shows a view used to explain small previews displayed when a page is deleted on the job-edit screen.

DESCRIPTION OF THE PREFERRED EMBODIMENTS

First Embodiment

Hereinbelow, a description will be given of a first embodiment suited for application of the present invention.

Figure 1:
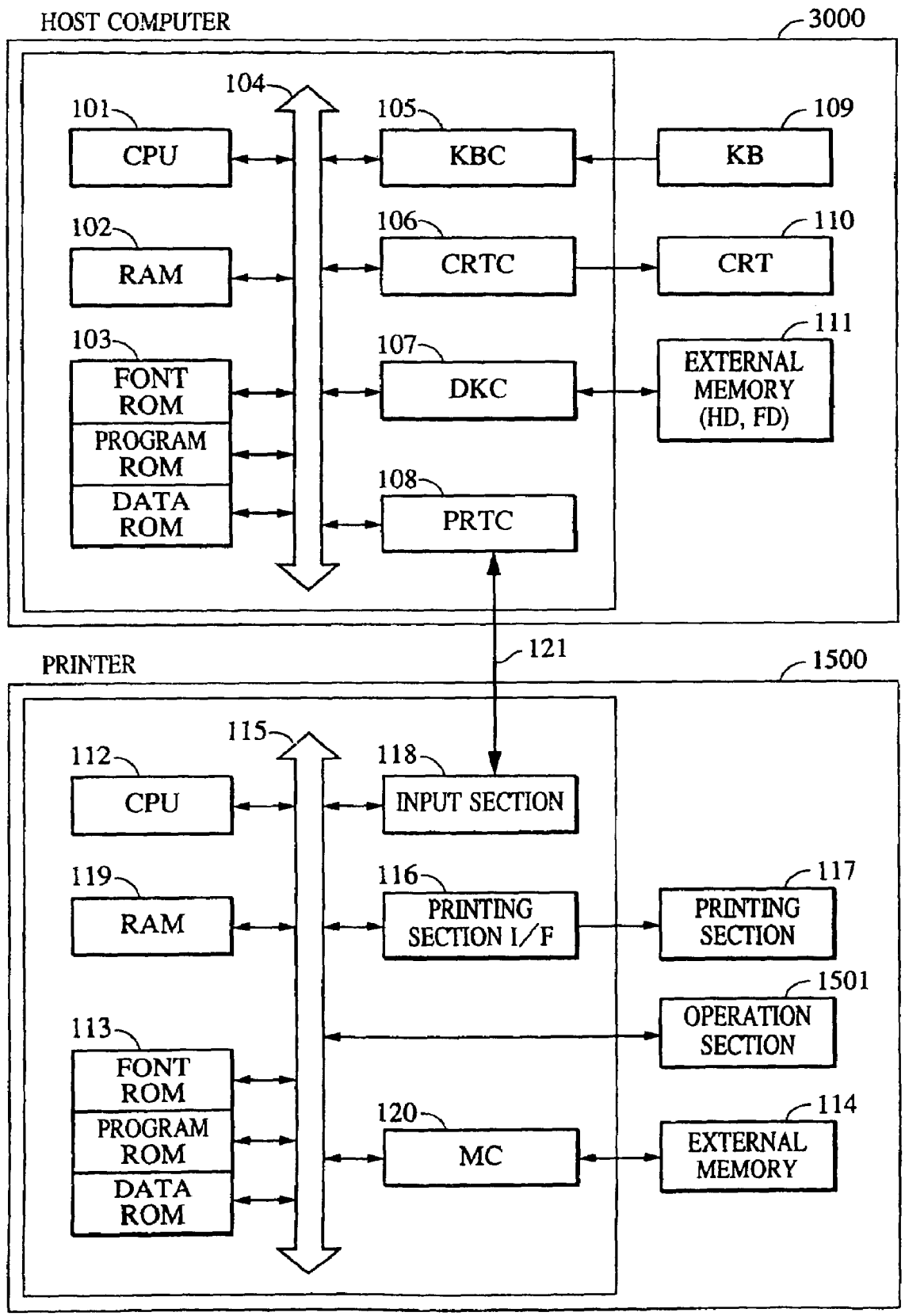
FIG. 1 is a block diagram of a configuration of a print control unit according to a first embodiment.

FIG. 1 shows a block diagram of an embodiment of a printer control system. The present invention is applicable to any type of a single unit type, a system configured of multiple devices, and a system connected via networks such as a local area network (LAN) and a wide area network (WAN).

In the figure, a host computer 3000 has a central processing unit (CPU) 101 that processes documents containing, for example, graphics, images, characters, tables (including table computation). The CPU 101 executes processing of documents according to, for example, a document-processing program stored in one of a program read-only memory (ROM) in a ROM 103 and an external memory 111. The CPU 101 also performs total control of individual devices connected to a system bus 104. Either the program ROM in the ROM 103 or the external memory 111 is used to store an operating-system program (which is referred to as an OS, hereinbelow) that is a control program for the CPU 101. Either the external memory 111 or a font ROM in the ROM 103 stores data including font data used for the documentation processing. Also, either the external memory 111 or a data ROM of the ROM 103 is used to store various data that is used in the documentation processing. A random-access memory 102 (RAM) performs area functions, such as a main area and a work area of the CPU 101.

A keyboard controller 105 (KBC) controls input data keyed in on a keyboard (KB) 109 and data entered using a pointing device (not shown). A CRT controller 106 (CRT) controls display by a CRT display 110 (CRT). A disk controller 107 (DKC) controls access with the external memory 111 that consists of storing mediums such as a hard disk (HD) and a floppy disk (FD). The external memory 111 stores various data including a boot program, various applications, font data, user files, edit files, and a printer-control-command generating program (which is referred to as a printer driver, hereinbelow). A printer controller 108 (PRTC) is connected to a printer 1500 via a two-way interface 121 (which is simply referred to as an interface, hereinbelow) so as to execute communication-control processing. In most cases, a printer is shared by multiple information-processing apparatuses, and multiple printers are connected in a LAN environment. Therefore, the interface 121 is preferably a network such as an ethernet.

The CPU 101 executes, for example, rasterizing processing for outline fonts to a display-information RAM set in the RAM 102, thereby enabling WYSIWIG. In addition, the CPU 101 opens various registered windows according to commands given using a device such as a mouse cursor to execute various data. When printing is executed, a user opens a printing-related window and is permitted to carry out a specification thereon. The specification includes selection of a printer, a printing method, and a printing mode.

The printer 1500 is controlled by a CPU 112. The CPU 112 outputs image signals as output information to a printing section 117 (printer engine) connected to a system bus 115. The control is performed according either to a control program and the like stored in a program ROM in a ROM 113 or to a control program and the like stored in an external memory 114. In addition, the program ROM in the ROM 113 is used to store a control program for the CPU 112. A font ROM in the ROM 113 is used to store font data and the like that is used in generation of the aforementioned output information. In a printer that does not have the external memory 114 consisting of memory media such as a hard disk, a data ROM in the ROM 113 is used to store information and the like that are used in the host computer 3000.

The CPU 112 is configured to be capable of communicating with the host computer 3000 via an input section 118, thereby being able to post information in the host computer 3000. A RAM 119 functions as memories, such as a main memory and a work area for the CPU 112. For this reason, the RAM 119 is configured so that the memory capacity can be expanded by connecting an option RAM to an expansion port (not shown). The RAM 119 is used as an output-information expansion area, an environment-data storing area, a NVRAM, and the like.

The aforementioned external memory 114, consisting of memory media such as a hard disk (HD) and an IC card, is controlled by a memory controller 120 (MC). The external memory 114 is optional for connection to store data such as font data, an emulation program, and form data. The input section 118 has switches for operations on an operation panel, a LED display unit, and so forth.

The external memory 114 is not restricted to be one, but it may include a plurality of external memories. The plurality of external memories may include, in addition to preset fonts, an option card and an external memory that stores a program for interpreting printer-control languages in different language systems. In addition, it may be configured such that a NVRAM (not shown) is provided to store printer-mode specification information provided from an operation section 1501.

Figure 2:
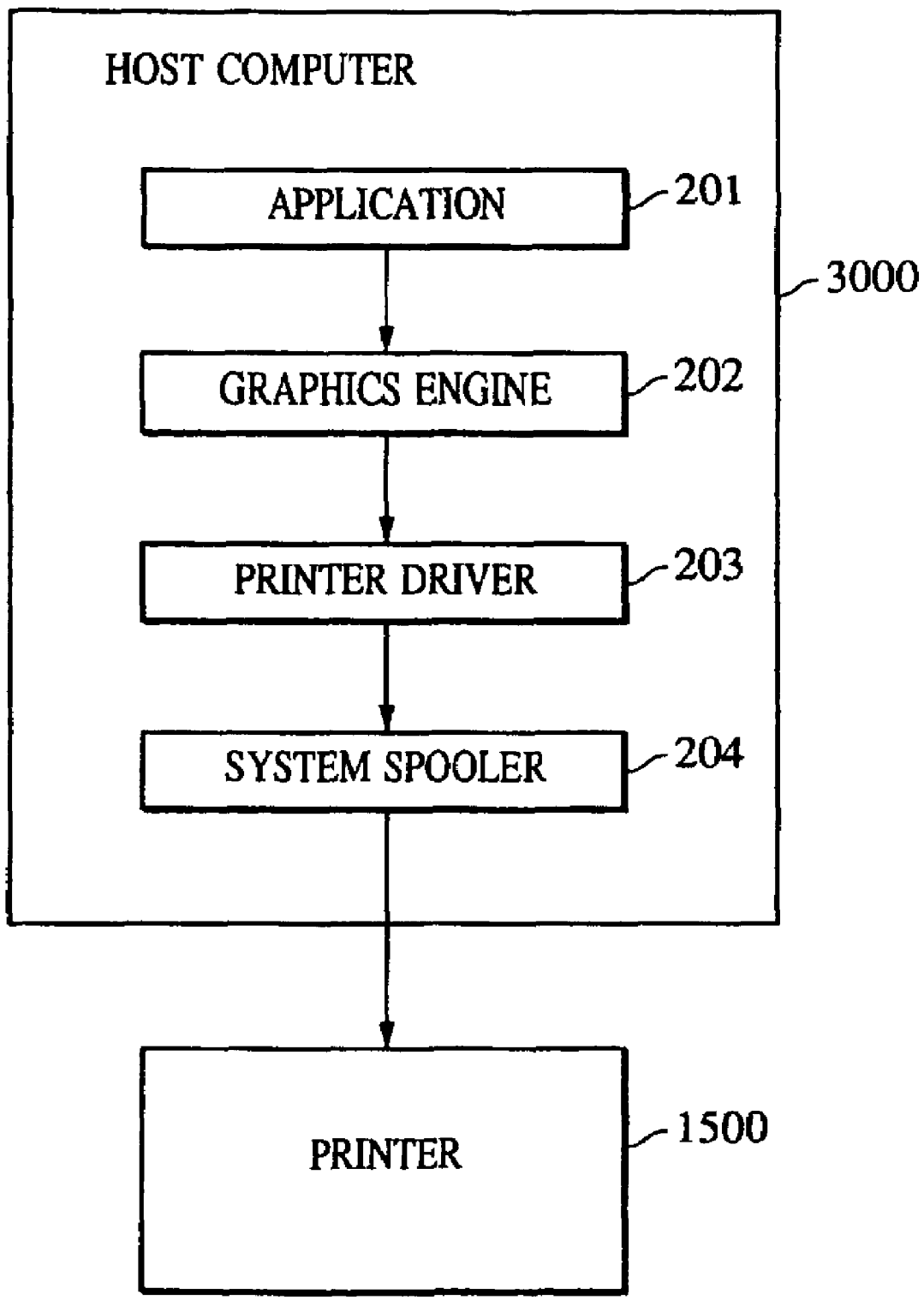
FIG. 2 is a schematic view of a configuration of a typical printing system with a host computer connected to a printer.

FIG. 2 is a configurational view of typical printing processing in the host computer 3000 to which a printer is directly connected or connected via a network. An application 201, a graphics engine 202, a printer driver 203, and a system spooler 204 are stored as files in the external memory 111. In execution, however, they are used as program modules. The modules are loaded into the RAM 102 and are executed either by the OS or by other modules that use those modules. The application 201 and the printer driver 203 may be additionally stored in an FD or a CD-ROM (not shown).in the external memory 111. Alternatively, they may be additionally stored in the HD in the external memory 111 via a network (not shown). The application 201 stored in the external memory 111 is loaded into the RAM 102, then executed. Similarly, when printing is executed by the printer 1500 at the request from the application 201, the graphics engine 202 loaded into the RAM 102 to be the ready for execution is used to output rendering data. Here, a description will be given, referring to the Windows® OS developed by Microsoft Corp. In Windows®, a graphics engine corresponding to the graphics engine 202, which is a rendering-means of the OS, is generally called a graphic device interface (GDI), and applications thereof output rendering data called a GDI function to the GDI that functions as the graphics engine.

Similarly, the graphics engine 202 loads the printer driver 203 prepared for each printer from the external memory 111 into the RAM 102. Then, the graphics engine 202 converts the output to a DDI (device driver interface) function and outputs the DDI function to the printer driver 203. According to the DDI function received from the graphics engine 202, the printer driver 203 converts it to a control command that is recognizable by the printer, for example, in the page description language (PDL). The converted control command is then outputted to the printer 1500 as print-data via the system spooler 204 loaded by the OS into the RAM 102.

Figure 3:
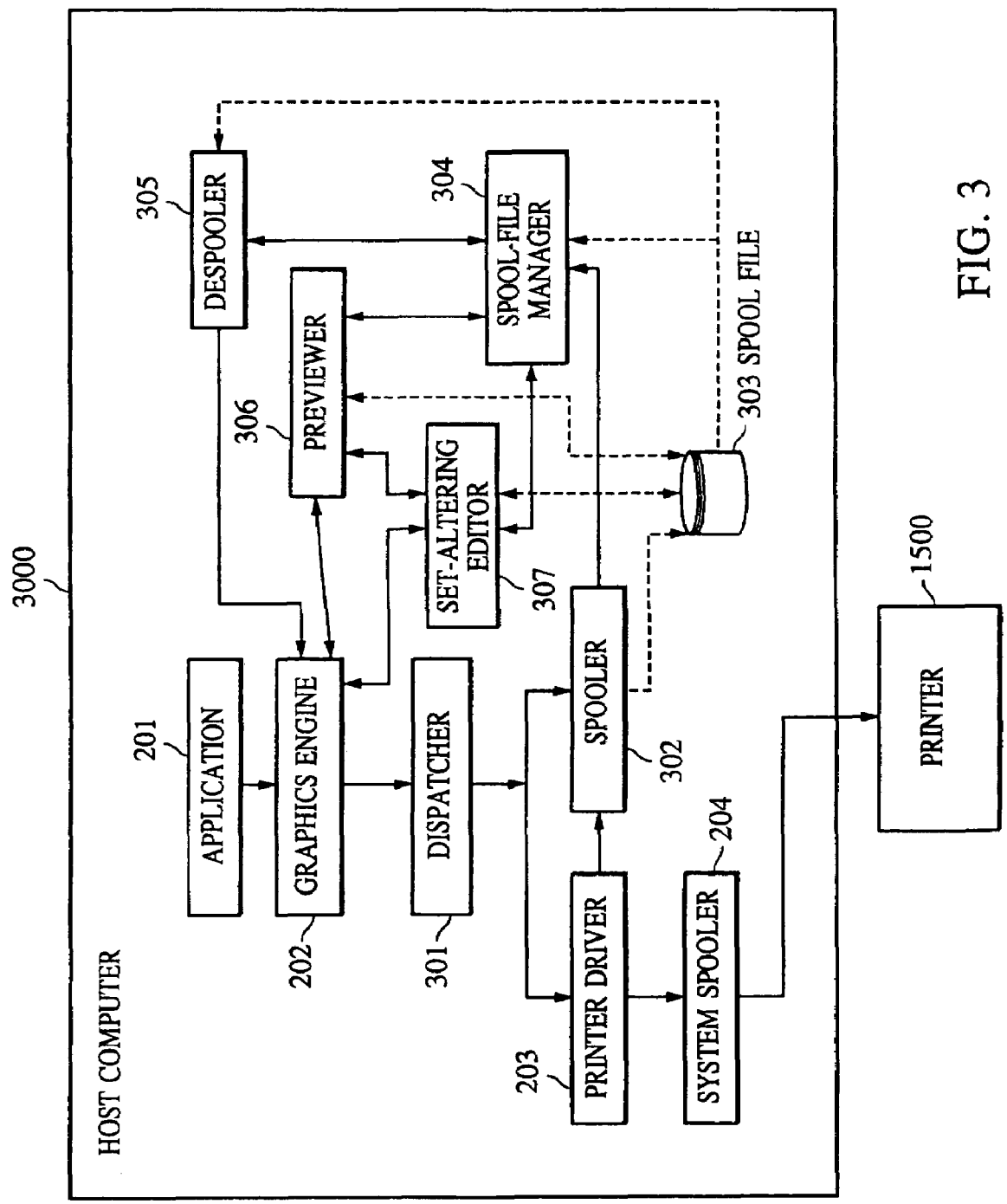
FIG. 3 is a block diagram of a configuration of a print system in which intermediate codes are spooled once before print requests from an application are converted to printer control commands.

In addition to the configuration consisting of the printer 1500 and the host computer 3000 that are shown in FIG. 2, the printing system of the first embodiment has a configuration as shown in FIG. 3. In the configuration, the print-data from the application 201 is spooled once using intermediate code data.

The system shown in FIG. 3 has the configuration extended from the configuration in FIG. 2. In the configuration, in response to a print command issued from the graphics engine 202 to the printer driver 203, a spool file 303 configured of the intermediate code data is generated once. In the system shown in FIG. 2, the application 201 is relieved from printing processing after the printer driver 203 converts all printing commands received from the graphics engine 202 to control commands that are recognizable by the printer 1500. In the system shown in FIG. 3, however, an application 201 is relieved from printing processing after a spooler 302 converts all printing commands to intermediate code data and outputs them to the spool file 303. In ordinal conditions, the latter is quicker than the former. In addition, the system in FIG. 3 allows processing of contents in the spool file 303. By this, functions that applications do not have can be implemented. For example, the functions allow magnification/reduction printing and reduction printing of multiple pages in a single page.

To achieve these objects, the system in FIG. 2 was extended so that data can be spooled with intermediate codes as in the system in FIG. 3.

To enable the system to process print-data according to a standard method, specifications are performed through windows provided by the printer driver 203, and the specified contents are stored in one of the RAM 102 and the external memory 111.

Hereinbelow, a detailed description will be given of the system shown in FIG. 3.

As shown in FIG. 3, in the extended processing method, a dispatcher 301 receives a DDI function from the graphics engine 202. The DDI function is a print command. When the DDI function received from the graphics engine 202 (rendering means of the OS) is a print command (GDI function) issued from the application 201 to the graphics engine 202, the dispatcher 301 loads the spooler 302 into the RAM 102 and sends the print command (DDI function) to the spooler 302 (not to the printer driver 203). The spooler 302 interprets the received print command and converts it to an intermediate code data that allows easy processing in page units.

A spool file that contains the intermediate code data in page units is called a page description file (PDF). The spooler 302 fetches print-data processing specifications that are set for the printer driver 203. The print-data processing specifications are set for, for example, Nup printing, double-sided printing, stapling, and color and/or monochrome printing for print-data. Then, the spooler 302 stores the specifications in the spool-file 303 in the file units. The specification file is called a job specification file (which may-be simply called a SDF (spool-description file), hereinbelow). The job specification file will be described in detail in a later part of this document). An operator preliminarily sets print-data processing specifications when performing setting for the printer driver 203; that is, print-data processing specifications are set by an operator before a print command is issued from the application 201.

Figure 8:
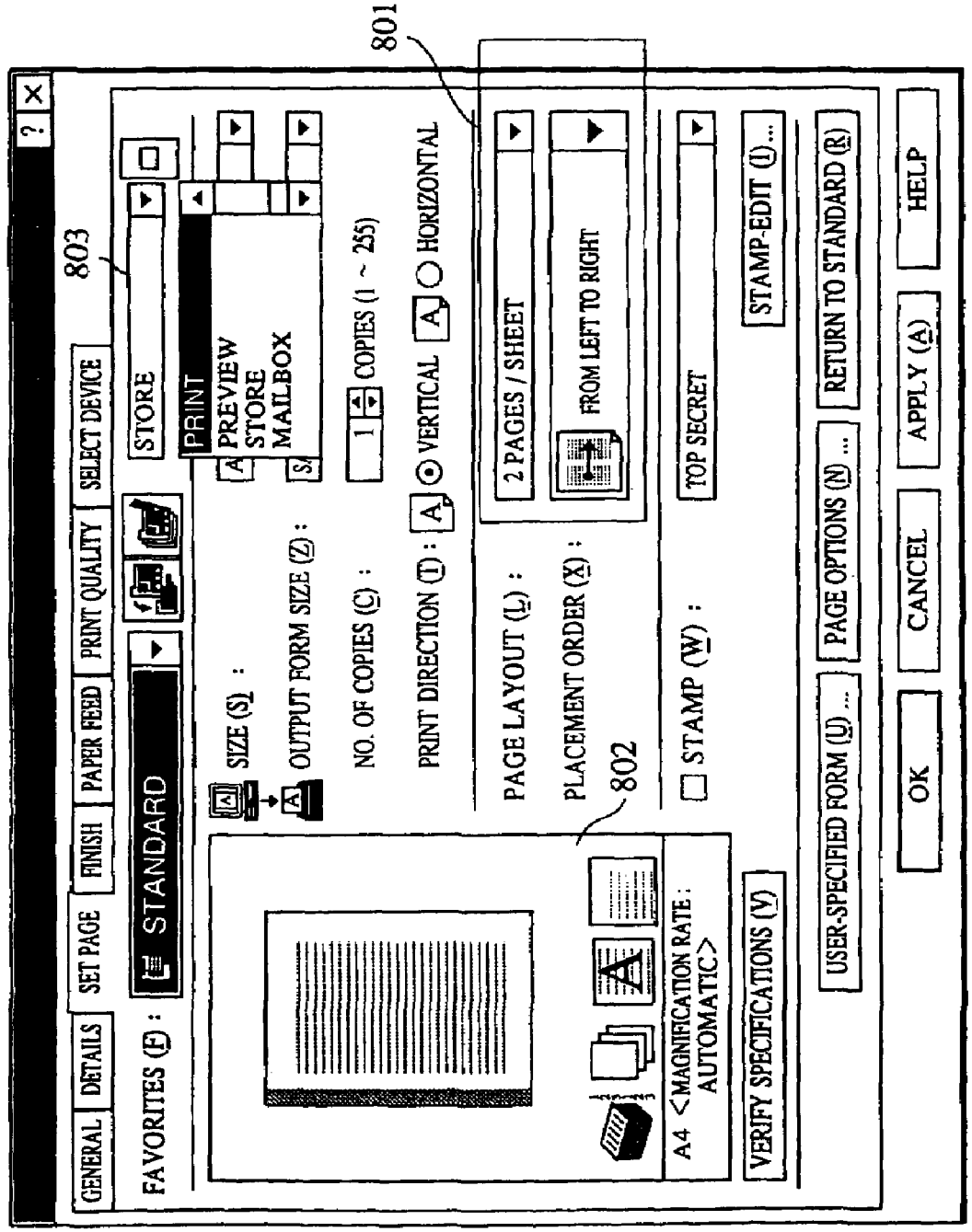
FIG. 8 shows an example print-specification screen controlled by a printer driver.

FIG. 8 shows an example property screen that allows print specifications to be set for the printer driver 203. In this case, although the operator can set detailed print specifications, a description will be specifically given of finishing processing that relates to the present invention.

A display field 801 in FIG. 8 allows specification of a page layout. A pull-down window on the right of the heading "Page Layout (L):" allows a specification of Nup printing to be set by selection a menus from, for example, "1 Page/Sheet (Standard)", "2 Pages/Sheet", "4 Pages/Sheet", "6 Pages/Sheet", and "8 Pages/Sheet". In a pull-down window on the right of the heading "Placement Order (X):" allows a specification of the placement order of logical pages to be set. For example, selection of the menu "2 Pages/Sheet" allows specification of one of two placement orders "From Right To Left" and "From Left to Right". Similarly, selection of "4 Pages/Sheet" allows specification of one of, four placement orders "From Upper Left to Right", "From Upper Left to Lower", "From Upper Right to Left", and "From Upper Right to Lower".

Thus, in FIG. 8, the page layout is set to "2 Pages/Sheet", and the placement order is set to "From Left to Right". The screen shown in the figure informs the operator that, as shown in a preview window in a display field 802, data for two pages is placed on one sheet so that logical pages are increased in the left-to-right direction and is so rendered.

Figure 27:
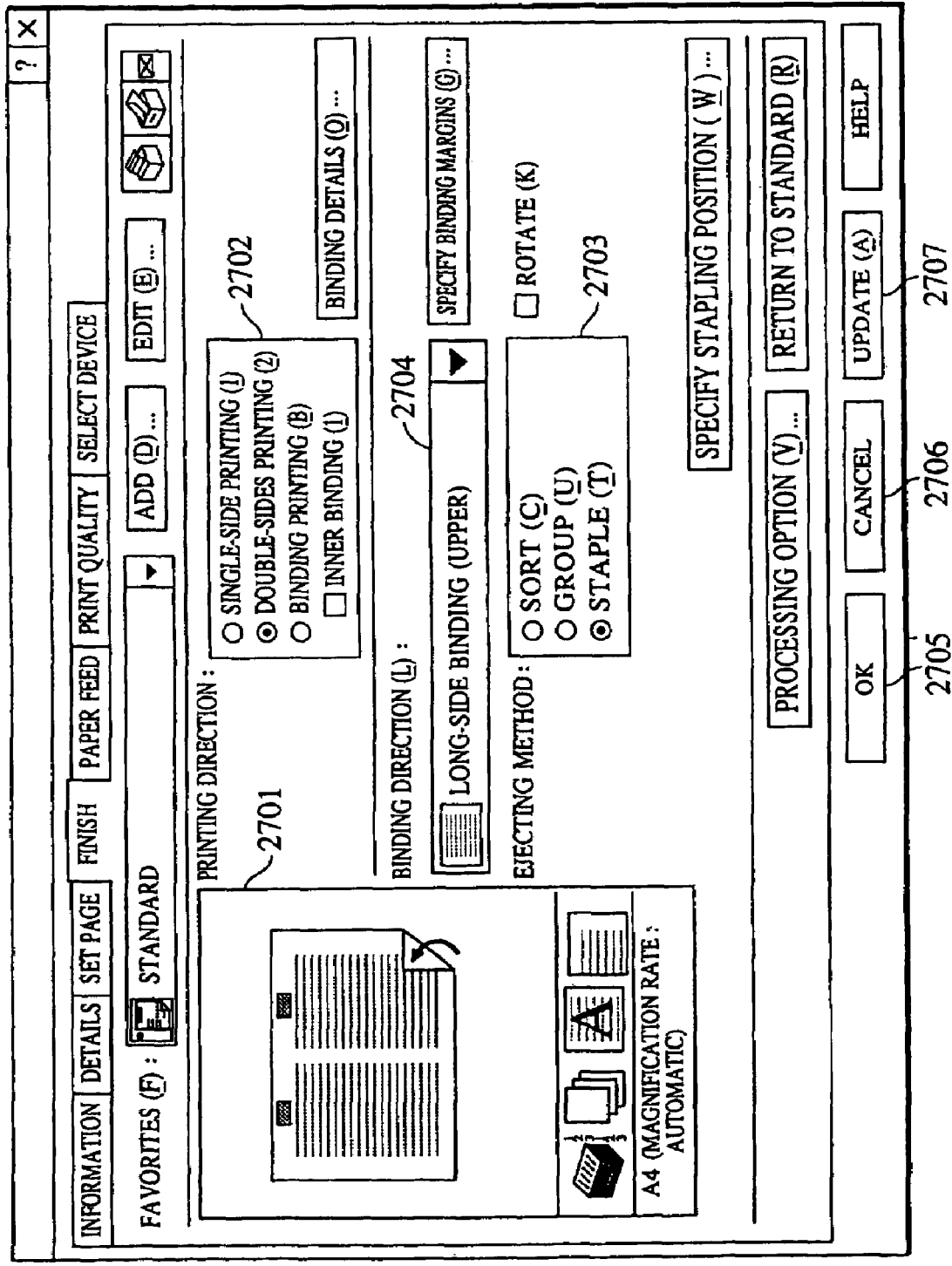
FIG. 27 shows a property screen controlled by the printer driver in a case where print-specification information is set.

FIG. 27 shows a similar example of the property screen that allows print specifications to be set for the printer driver 203. A display field 2702 allows specification of a printing method. There are three printing methods. They are a "Single-Side Printing" method, a "Double-sided printing" method, and a "Binding Printing" method; and any one of these types can be selected for the specification. A display field 2703 allows an ejecting method to be specified by selection of any one of the menus "Sort", "Group", and "Staple". A display field 2704 allows specification of a binding direction for stapling. A pull-down window under the heading "Binding Direction (L)" allows selection of any one of "Length-Side Binding (Upper)", "Length-Side Binding (Lower)", "Short-Length-Side Binding (Left)", and "Short-Length-Side Binding (Right)".

Thus, In FIG. 27, the printing method is set to "Double-sided printing", and the ejecting method is set to "Staple". This screen informs the operator that, as shown in a preview window in a display field 2701, double-sided printing is in progress as indicated by the lower-right corner turned over, and the upper long side of the forms is stapled.

As described above, the operator can set detailed print specifications for the printer driver 203. The spooler 302 fetches the print-data processing specifications set for printer driver 203 from the printer driver 203 and stores the specifications in the spool file 303. According to described system, the spool file 303 is generated in the external memory 111 as a file. However, an arrangement may be such that the spool file 303 is generated in the RAM 102.

In addition, the spooler 302 loads a spool-file manager 304 stored in the external memory 111 into the RAM 102 and posts a notification on a generation status of the spool file 303 in the spool-file manager 304. Thereafter, the spool-file manager 304 accesses the contents of the print-data processing specifications set stored in the spool file 303; thereby, determining as to whether or not the specified printing can be executed.

If the spool-file manager 304 determines that printing can be executed by using the graphics engine 202, it loads a despooler 305 stored in the external memory 111. Then, the spool-file manager 304 commands the despooler 305 to print, the page description file of the intermediate code data described in the spool file 303.

The despooler 305 processes the page description file of the intermediate code data included in the spool file 303 according to the contents of the job specification file that includes the processing-specification information included in the spool file 303. Subsequently, the despooler 305 regenerates the GDI function and reoutputs the GDI function via the rendering means of the OS, that is, the graphics engine 202.

When the print command (DDI function) received from the graphics engine 202 (rendering means of the OS) is the print command (GDI function) issued from the despooler 305 to the graphics engine 202, the dispatcher 301 loads the spooler 302 into the RAM 102 and sends the print command to the printer driver 203 (not to the spooler 302). The printer driver 203 generates a printer control command coded in a language such as PDL according to the DDI function fetched from the graphics engine 202 (rendering means of the OS). Then, the printer driver 203 outputs the printer control command to the printer 1500 via the system spooler 204.

FIG. 3 also shows an example configuration that has a previewer 306 and a specification-modifying editor 307 in addition to the extended system described above and that allows modification of print-data processing specifications.

As a method for implementing the previewer 306, the print-data processing specifications stored in the spool file 303 include a specification set to determine whether or not a preview screen is displayed. The print-data processing specifications are read by the spool-file manager 304. As a result, if the spool-file manager 304 detects a preview specification, it determines whether the specified preview screen can be displayed according to the contents of the print-data processing specifications stored in the spool file 303. In addition, the specification to determine whether or not a preview screen is displayed can be implemented by the provision of, for example, a user-interface screen as shown in FIG. 8. To display the print-preview screen and to modify print specifications thereon, on a screen of properties of the printer driver 203, which is shown in FIG. 8, "store" must be specified in the pull-down menu that is a means for performing "output-destination specification". Only for displaying a preview screen, "preview" is selected as the output-destination specification.

Thus, the contents specified for properties of the printer driver 203 are stored in a structure (which corresponds to the structure called DEVMODE in Windows® OS) provided by the OS as a specification file. The structure includes, for example, a specification, that is set to determine whether storing is performed, is included in print-data processing specifications that are included in the spool-file manager 304. The print-data processing specifications are read by the spool-file manager 304 via the printer driver 203. As a result, if the spool-file manager 304 detects the specification for storing, the page description file and the job specification file are generated and stored in the spool file 303, as described above. Then, as shown in FIG. 9, a window screen controlled by the spool-file manager 304 is popped up, and a job spooled by the spool file 303 is displayed in a list format (list-displayed) on the screen.

Figure 9:
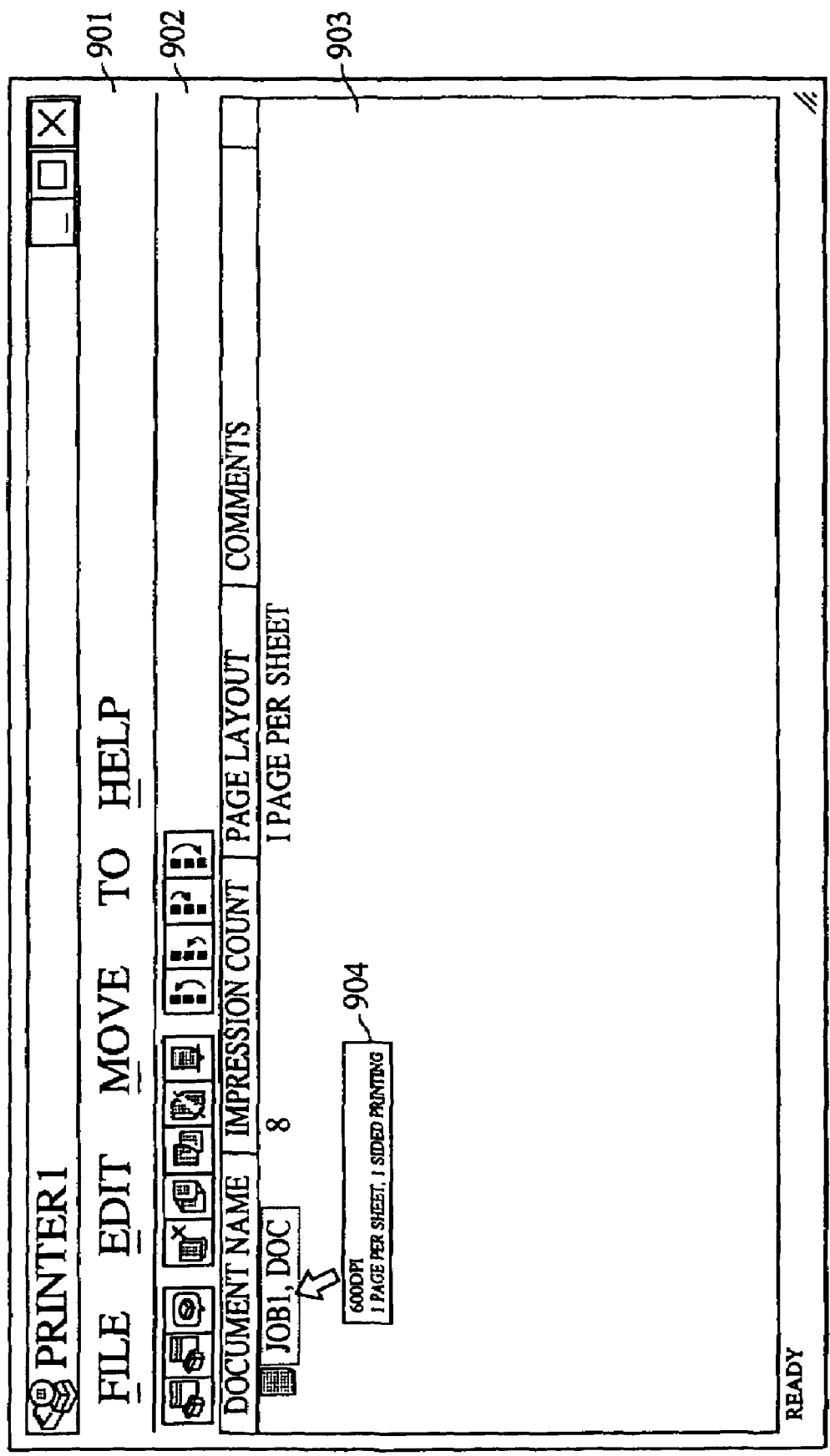
FIG. 9 shows an example print-specification screen in which a spool file is list-displayed.

FIG. 9 shows an example in which one job is spooled. Pressing a menu bar 901 and menu icons 902 thereunder allows the job to be performed. Operations of the job include "Print" for printing in a job-selected state, "Save and Print" for printing in a state where the spool file is saved, "Preview" for seeing an output preview of the job that reflects considerations for print specifications, "Delete" for deleting a spool file of intermediate code data, "Copy" for copying a spool file of intermediate code data, "Job Edit" for modifying print specifications (such as a layout specification and finishing specification) for a job, and "Modify Priority" for replacing print priority of jobs.

When previewing of a job is specified on the window screen (FIG. 9) of the spool-file manager 304; the previewer 306 stored in the external memory 111 is loaded into the RAM 102, and the system commands the previewer 306 to execute preview processing for the job that corresponds to an intermediate code described in the spool file 303.

The previewer 306 sequentially reads page description files (PDFS) of intermediate codes included in the spool file 303. Then, the previewer 306 processes the PDFs according to the contents of processing-specification information included in the job specification file (SDF) stored in the spool file 303. Subsequently, the previewer 306 regenerates GDI functions according to the processed intermediate data, and outputs them to the graphics engine 202. In this case, the output destination is set to a client area of its own (a display device), and the graphics engine 202 outputs a DDI function for the display device; thereby allowing display on screens to be implemented.

The graphics engine 202 can perform appropriate rendering corresponding to a specified output destination. As described above, the previewer 306 can be realized in a method where, similarly to the despooler 305, the previewer 306 processes intermediate codes included in the spool file 303 according to the contents of print-data processing specifications included in the spool file 303 and outputs them by using the graphics engine 202.

Thus, data in the page description file is processed according to the job specification file, and thereby, print-data processing specifications set for the printer driver 203 are outputted. According to this method, print-previews that are close to prints that would actually be outputted by a printer and that correspond to various cases can be provided to users. The cases are such that specifications are set for displaying a preview screen of an actual print, for Nup printing (processing to perform reduction printing of an n number of logical pages and to arrange the pages in a single physical page), for double-sided printing, for binding printing, and for stamping printing.

According to preview functions of, for example, conventional documentation-creating application software performs rendering according to its specific page-setting. In this case, print specifications set for a printer driver thereof are not effective; therefore, preview screens of actual prints are not recognizable to users.

Figure 11:
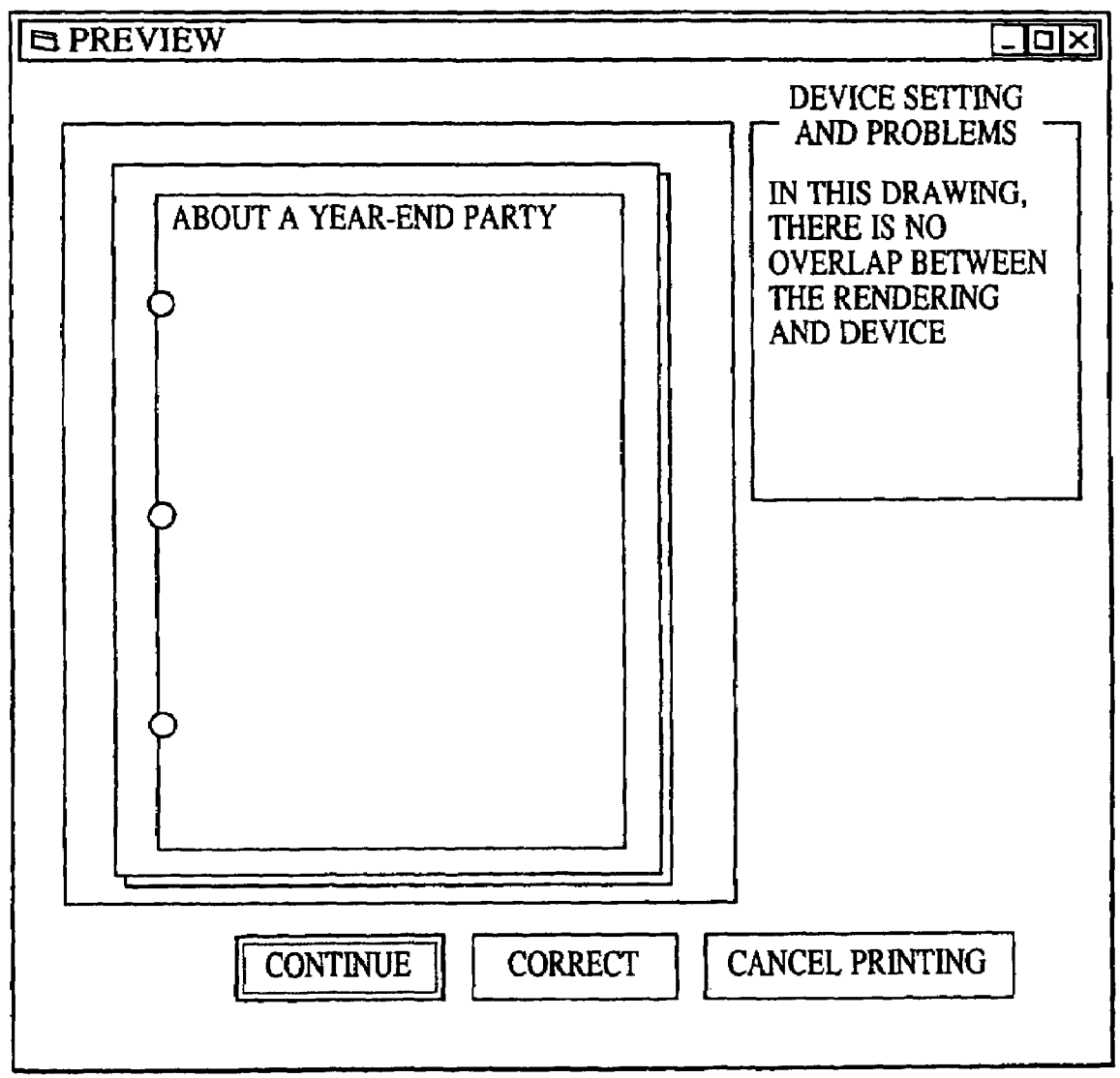
FIG. 11 shows an example preview screen.

The preview processing performed as described above allows the previewer 306 to display a large preview screen (as shown in FIG. 11) according to print-data processing specifications included in the spool file 303. Thereafter, the previewer 306 is closed, and control shifts to display of the window screen (in FIG. 9) of the spool-file manager 304.

When a user requests for printing according to the contents displayed by the previewer 306, a user can specify one of "Print" and "Save And Print" for the spool-file manager 304. This issues a print request. As described above, upon issuance of the print request, the page description file is processed by the despooler 305 according to the job specification file, and the GDI function is thereby generated. Subsequently, the print request is posted in the graphics engine 202, and a print command is sent to the printer driver 203 via the dispatcher 301. Then, printing is executed.

When a preview screen for print-processing specifications included in the spool file 303 is displayed according to the contents displayed by the previewer 306, the user can request for printing through the previewer 306. The print request is posted in the spool-file manager 304, and the spool-file manager 304 carries out the print request according to the system described with reference to FIG. 3.

In addition, the user can perform modification by seeing the output contents displayed by the previewer 306. Such modification can be realized by the provision of an operation method in which the previewer 306 modifies the contents of the spool file 303 to the user.

Hereinbelow, a description will be given of modification of specifications, which is performed by use of the previewer 306.

As in the case of the preview processing, a method for implementing the aforementioned modification can be applied for jobs specified with the "Store" menu shown in FIG. 8. Similarly to the flow in the preview processing, the window screen (shown in FIG. 9) of the spool-file manager 304 is popped up, and spooled jobs are list-displayed on the screen. When "Job Edit" is specified, and modification of the specifications is specified on the aforementioned window screen (FIG. 9), the specification-modifying editor 307 in the external memory 111 is loaded into the RAM 102. Then, the specification-modifying editor 307 is commanded to display the current or default print-processing specifications. As a result, a job specification screen as shown in FIG. 29 is displayed.

The specification-modifying editor 307 fetches a job specification file for the job specified in "Job Edit" from the spool file 303. Subsequently, the specification-modifying editor 307 modifies default values displayed on the job specification screen in FIG. 29 according to specification items set in the job specification file. According to examples shown in FIG. 29, the job specification file specified with "Job Edit" includes specifications set as "Number of Copies: 1 Copy", "Printing Method: Single-Side Printing", "Staple: (not required)", and "Layout: 1 Page/Sheet".

Also with the specification-modifying editor 307, the page description file of intermediate codes included in the spool file 303 is processed according to the contents of print-processing specifications included in the job specification file stored in the spool file 303. Then, the specification-modifying editor 307 uses the graphics engine 202 to output the processed specifications to its own client area. This allows small preview images as shown in FIGS. 18A to 18E to be displayed.

Also, in this case, the contents of the print-processing specifications included in the job specification file stored in the spool file 303 can be modified or corrected. In this connection, specifiable items for the printer driver 203 may either be possessed by a user interface of the specification-modifying editor 307; alternatively, a user interface of the printer driver 203 may be called.

Thus, as shown in FIG. 29, specifications can be set for the number of copies, printing method (for single-side printing, double-sided printing, binding printing), stapling method (such as saddle-finisher stapling), page layout, placement order, and others. In addition, pressing a button 2907 named "Detailed Settings" allows the most specifiable items for the printer driver 203 to be respecified. However, modification of specifications related to print-quality items for, for example, resolutions and graphics modes, is not permitted.

Items modified in the above are authorized at an authentication request. Then, control shifts to the spool-file manager 304. Although the authorized modification items are stored as modified print specifications, they are not stored in the original job specification file. The authorized modification items are stored in a newly generated job-outputting specification file that is used for, for example, job-editing processing. The job-outputting specification file will be described in detail in a later portion.

As in the case of confirmation made while seeing a preview screen with the previewer 306, to request for printing that is performed according to the contents of the modified specifications, the user can issue a print request with the spool-file manager 304. The print-request is posted in the graphics engine 202, and a print command is sent to the printer driver 203 via the dispatcher 301; thereby, printing is executed.

Hereinbelow, a description will be given of a printer of the present invention.

Figure 4:
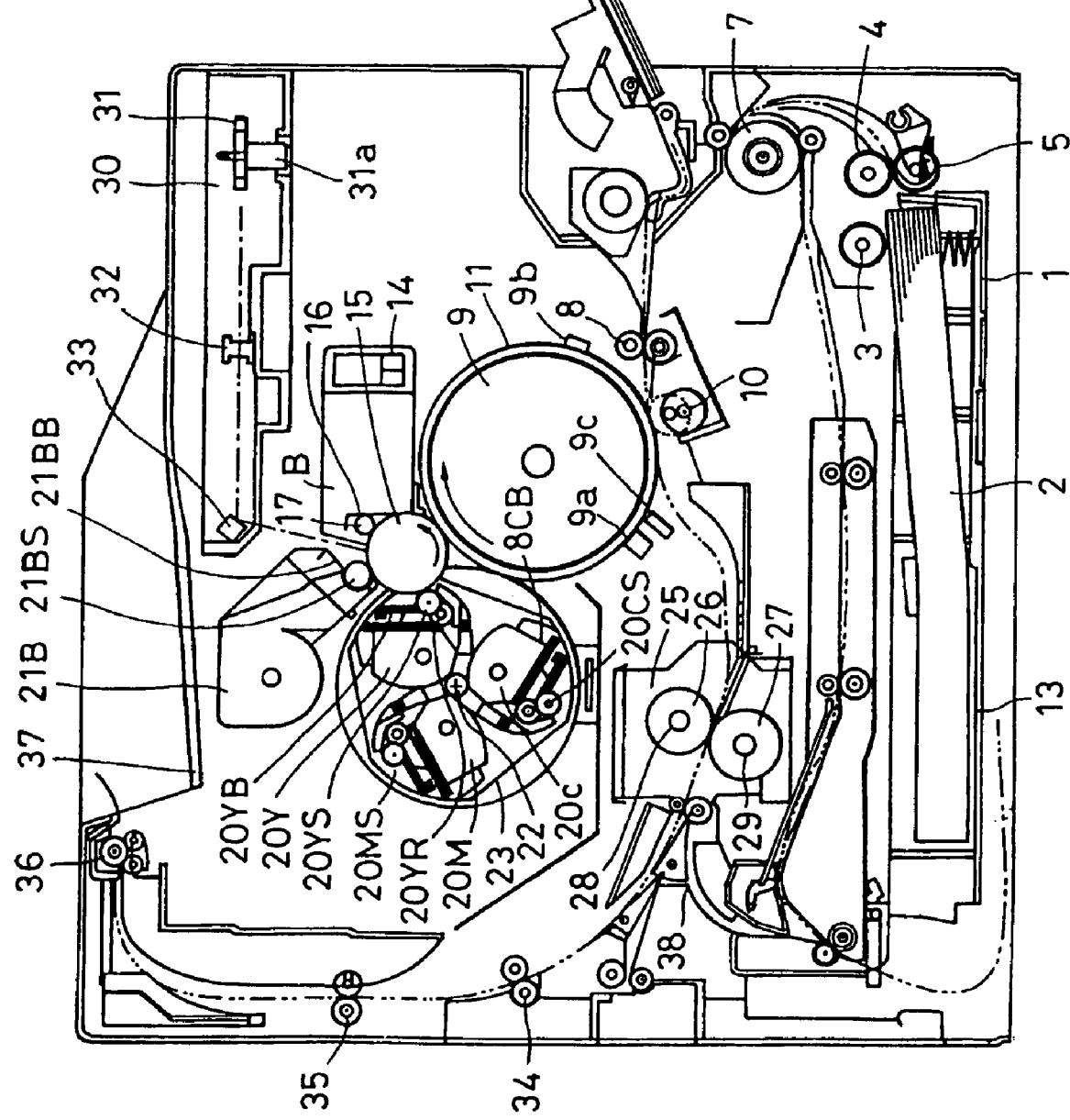
FIG. 4 is a view of a printer according to the present invention.

FIG. 4 is a cross-sectional view of an example of the printer 1500. The example is a color laser printer that has a double-sided-printing function.

The printer scans a photosensitive drum 15 by using a polygon mirror 31 for laser beams modulated according to image data obtained from print-data inputted to the host computer 3000 for individual colors. Thereby, the printer forms an electrostatic latent image. Then, the printer performs toner-development of the electrostatic latent images. From the electrostatic latent images, the printer obtains visual images. Subsequently, the printer performs multitranscription of the visual images in all the colors to an intermediate transcription object 9, thereby forming a color visual image. Thereafter, the printer transcribes the color visual image onto a transcription object 2 and fixes it thereon.

An image-forming section controls the above operations and is configured of a drum unit B that has the photosensitive drum 15; a first charged section that has a contact charged roller 17; a cleaning section; a developing section; the intermediate transcription object 9; a forms-feeding section that includes a forms tray 1 (cassette) and rollers 3, 4, 5, and 7; and a fixing section 25 that includes a transcription roller 10.

The drum unit B is an integrated unit-formed of the photosensitive drum 15 (sensitive object) and a cleaner container 14 that has a cleaning mechanism and that concurrently serves as a holder of the photosensitive drum 15. The drum unit B is supported to be removable from a main printer unit and is configured to be easily replaceable as a unit according to the service life of the photosensitive drum 15.

The photosensitive drum 15 is formed of an aluminum cylinder, and the outer surface thereof is coated with an organic beam conductive layer. It is rotatably supported by the cleaner container 14. The photosensitive drum 15 is rotated counterclockwise by a driving force transmitted from an electrically-driving motor (not shown) corresponding to image-formation operations. The surface of the photosensitive drum 15 is selectively exposed. Thus, electrostatic latent images are formed thereon.

In a scanner section 30, the polygon mirror 31 reflects modulated laser beams; thereby, the laser beams are emitted onto the photosensitive drum 15. The polygon mirror 31 is rotated by an-electric motor 31a in synchronization with horizontal-synchronous signals of image signals.

The developing section converts the aforementioned electrostatic latent images to visual images. To do this, the developing section is configured of three developing apparatuses 20Y, 20M, and 20C and a black-color developing apparatus 21B. The developing apparatuses 20Y, 20M, and 20C performs development for yellow (Y), magenta (M), and cyan (C), respectively. The developing apparatuses 20Y, 20M, 20C, and 20B have sleeves 20YS, 20MS, 20CS, and 20BS, respectively. Daubing blades 20YB, 20MB, 20CB, and 21BB that are pressed to be in contact with outer peripheral surfaces of the sleeves 20YS, 20MS, 20CS, and 21BS are provided, respectively. In addition, daubing rollers 20YR, 20MR, and 20CR are provided for the three sleeves 20YS, 20MS, and 20CS.

The black-color developing apparatus 21B is provided so as to be removable from the main printer unit. The individual developing apparatuses 20Y, 20M, and 20C are provided so as to be removable from a developing rotary 23 that rotates about a rotation axis 22 in the center.

The sleeve 21BS of the black-color developing apparatus 21B is arranged within a minute distance of, for example, about 300 μm, from the photosensitive drum 15. Also, the black-color developing apparatus 21B is provided such that toner is carried by a built-in feeding member, and the toner is electrically charged by frictional electrification so that the toner is applied by the daubing blade 21BB onto the outer peripheral surface of the sleeve 21BS that rotates clockwise. Also, according to application of a bias voltage used for development to the sleeve 21BS, development is performed onto the photosensitive drum 15 corresponding to the electrostatic latent image; thereby, black-toner visual images are formed on the photosensitive drum 15.

For forming images, the three developing apparatuses 20Y, 20M, and 20C individually rotate in conjunction with rotation of the developing rotary 23, and a predetermined one of the sleeves 20YS, 20MS, and 20CS is positioned opposing the photosensitive drum 15 within a minute distance of about 300 μm. Thereby, visual images are formed on the photosensitive drum 15.

For forming color images, the developing rotary 23 rotates per rotation of the intermediate transcription object 9, and development is sequentially performed by the yellow-color developing apparatus 20Y, the magenta-color developing apparatus 20M, the cyan-color developing apparatus 20C, and black-color developing apparatus 21B. Subsequently, the intermediate transcription object 9 rotates four times, thereby forming visual images using the individual types of the toners, that is, yellow-color toner, magenta-color toner, cyan-color toner, and black-color toner. As a result, a full-color visual image is formed on the intermediate transcription object 9.

The intermediate transcription object 9 is configured such that it is in contact with the photosensitive drum 15 to rotate in conjunction therewith, and it rotates clockwise receiving four times of transcription, that is, multitranscription, of visual images. Also, the intermediate transcription object 9 is in contact with the transcription roller 10 (to be described below) to sandwich and feed the transcription object 2. Thereby, simultaneous multitranscription of the color visual images is performed on the intermediate transcription object 9. On outer peripheral sections of the intermediate transcription object 9, there are provided a TOP sensor 9a and a RS sensor 9b for detecting the position in the rotation direction of the intermediate transcription object 9 and a density sensor 9c for detecting the density of the toner image.

The transcription roller 10 has a transcription charge unit supported so as to be detachable from the photosensitive drum 15. It is formed such that an intermediate-resistance foaming elastic material is wound around a metal axis.

As shown by a solid line in FIG. 4, during multitranscription of a color image onto the intermediate transcription object 9, the transcription-roller 10 is spaced downward from the intermediate transcription object 9 so as not to scatter the color visual images. After four color visual images are formed onto the intermediate transcription object 9, the transcription roller 10 is moved up by a cam member (not shown) to a position as indicated by a dotted line. It is so moved up in synchronization with timing of transcription of the color visual image onto the transcription object 2. According to the above, the transcription roller 10 is allowed to be in contact with the intermediate transcription object 9 at a predetermined pressing force via the transcription object 2 concurrently, a bias voltage is applied thereto, and the color visual images are transcribed on the transcription object 2.

The fixing section 25 feeds the transcription object 2. It has a fixing roller 26 for heating the transcription object 2 and a pressing roller 27 for pressing the transcription object 2 onto the fixing roller 26. The fixing roller 26 and the pressing roller 27 are formed in a tubular shape, and heaters 28 and 29 are built therein, respectively. According to the above, the transcription object 2 that holds the color visual image is transferred by the fixing roller 26 and the pressing roller 27, thereby being heated and pressed. As a result, toner is fixed on the surface of the transcription object 2.

After the visual image is fixed, the transcription object 2 is transferred and ejected by ejecting rollers 34, 35, and 36 to an ejection section 37. Then, the image-forming operation is completed.

A cleaning means cleans toner remaining on the photosensitive drum 15 and the intermediate transcription object 9. The cleaner container 14 stores the residual toner after use either in transcription of the toner-used visual images formed on the photosensitive drum 15 onto the intermediate transcription object 9 or in transcription of the four-color visual image formed on the intermediate transcription object 9 onto the transcription object 2.

The transcription object 2 (recording form) for printing is taken out from the forms tray 1 (cassette) via a forms-feeding roller 3, is sandwiched between the intermediate transcription object 9 and the transcription roller 10 and carried. Then, the transcription object 2 passes the fixing section 25, and the toner image is fixed thereon. For single-side printing, a guide 38 forms a transfer route to guide the transcription object 2 (recording form) to the ejection section 37 provided on an upper portion. For double-sided printing, however, the guide 38 forms a route so as to guide the transcription object 2 (recording form) to a double-sided unit in a lower portion.

The transcription object 2 (recording form) guided by the double-sided unit is transferred once to a lower portion of the forms tray 1 (cassette) (transfer route indicated by a double-dotted line). Then, the transcription object 2 (recording form) is transferred in the reverse direction to a double-sided print forms tray 39. In the double-sided print forms tray 39, the obverse and reverse faces of transcription object 2 (recording form) as mounted in the forms tray 1 (cassette) is mounted up side down. In this state, the toner image is retranscribed and re-fixed, thereby allowing double-sided printing to be executed.

Hereinbelow, a description will be given of the operation of the printing system according to the present invention.

Figure 5:
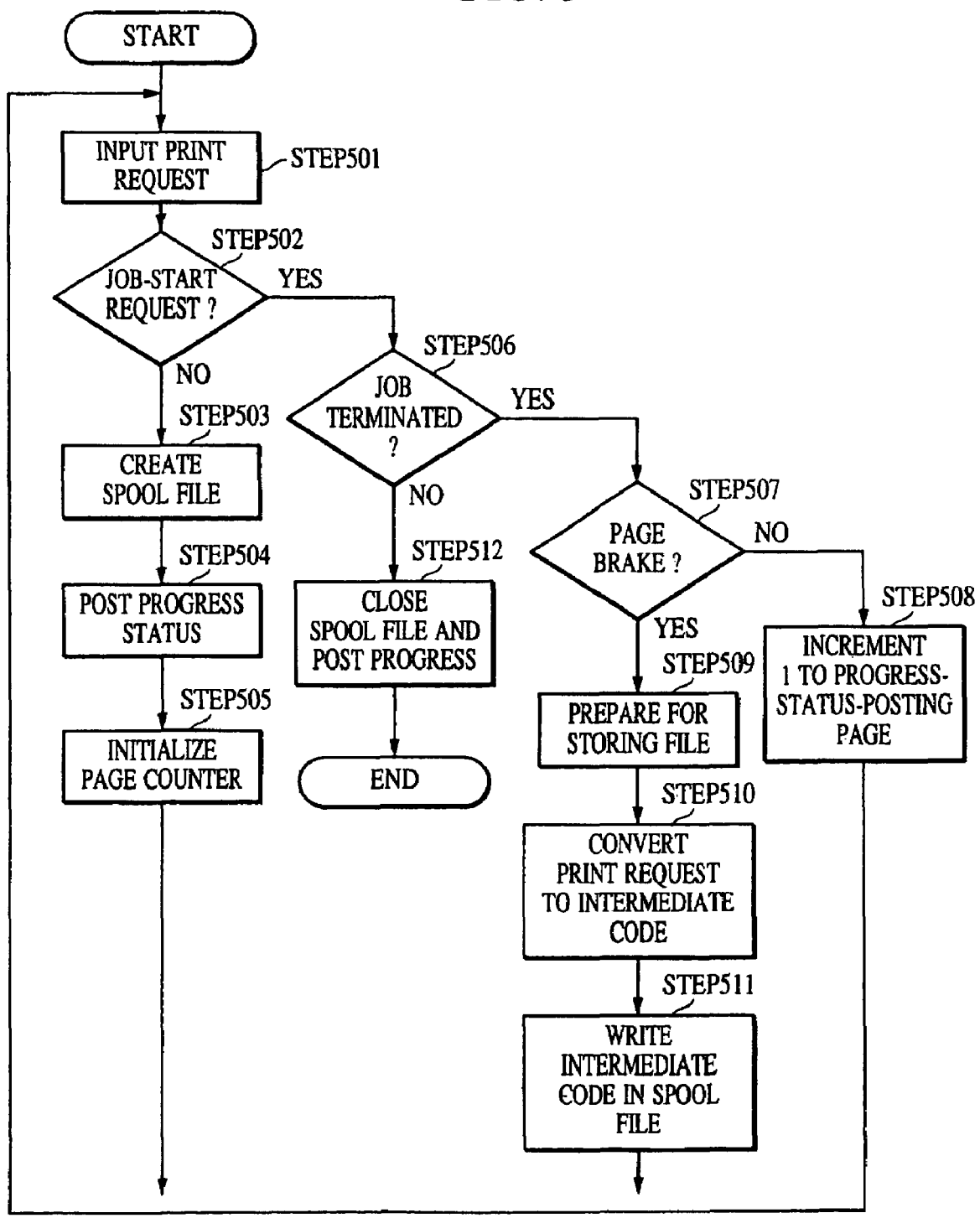
FIG. 5 is a flowchart of processing a spooler.

FIG. 5 is a detailed flowchart of processing in a page-unit preservation step for generation of the spool file 303 in the spooler 302. The processing is performed after, when a print request is issued from the application 201, the dispatcher 301 receives a DDI function (rendering data outputted from the graphics engine 202) and passes the rendering data to the spooler 302.

First of all, in step 501, the spooler 302 receives the print request, which was issued from the application 201, from the dispatcher 301 via the graphics engine 202. As described earlier, in the application 201, a dialog box as shown in FIG. 8 for allowing input is displayed before a print request is issued, and print specifications inputted through the dialog box are transferred from the printer driver 203 to the spooler 302. The dialog box for inputting specifications, as shown in FIG. 8, includes an item for specifying the number of logical pages that are allocated in one physical page.

In step 502, the spooler 302 determines if the received print request is a job-starting request. If step 502 determines the print request to be the job-starting request, processing proceeds to step 503. In step 503, the spooler 302 creates a spool file 303 in the RAM 102 for temporarily storing intermediate data. Subsequently, the spooler 302 receives print-specification information (DEVMODE) and stores it in the job specification file in the spool file 303.

Subsequently, the spooler 302 posts a notification of a printing progress status in the spool-file manager 304. Subsequently, in step 505, a page counter of the spooler 302 is initialized. The spool-file manager 304 reads the print-specification information, including processing specifications and information on a job or jobs of which printing is started, from the job specification file stored in the spool file 303.

In the described step 502, if the spooler 302 determines the print request not to be the job-starting request, processing proceeds to step 506. In step 506, the spooler 302 determines if the received print request is a job-terminating request. If the spooler 302 determines the print request to be the job-terminating request, processing proceeds to step 507. The step 507 determines if the received print request is a page-brake request. If step 507 determines the print request to be the page-brake request, processing proceeds to step 508. In step 508, the spooler 302 posts a notification of printing progress status in the spool-file manager 304. Then, the spooler 302 increments the page counter.

In the described step 507, if the spooler 302 determines the received print request not to be the page-brake request, processing proceeds to step 509. In step 509, the spooler 302 prepares for writing an intermediate code to the page description file.

Subsequently, in step 510, the spooler 302 converts the rendering data, the print request for characters, graphics, images, and the like, to intermediate data that will be stored in the spool file 303. In step 511, the spooler 302 writes the print request, which has been converted to a storable format (intermediate data), in the page description file in the spool file 303. Then, processing returns to step 501, in which the spooler 302 awaits another print request from the application 201.

The series of described processing steps from steps 501 to 511 is repeated until a job-terminating request (EndDoc). is received. Also, the spooler 302 fetches information, such as print-processing specifications stored in the DEVMODE structure, from the printer driver 203 and stores the information as a job specification file in the spool file 303.

In the described step 506, if the spooler 302 determines the print request from the application 201 to be the job-terminating request, the print request from the application 201 is due to be completed. Processing proceeds to step 12. In step 12, a notification of a printing progress status is posted in the spool-file manager 304.

Figure 6:
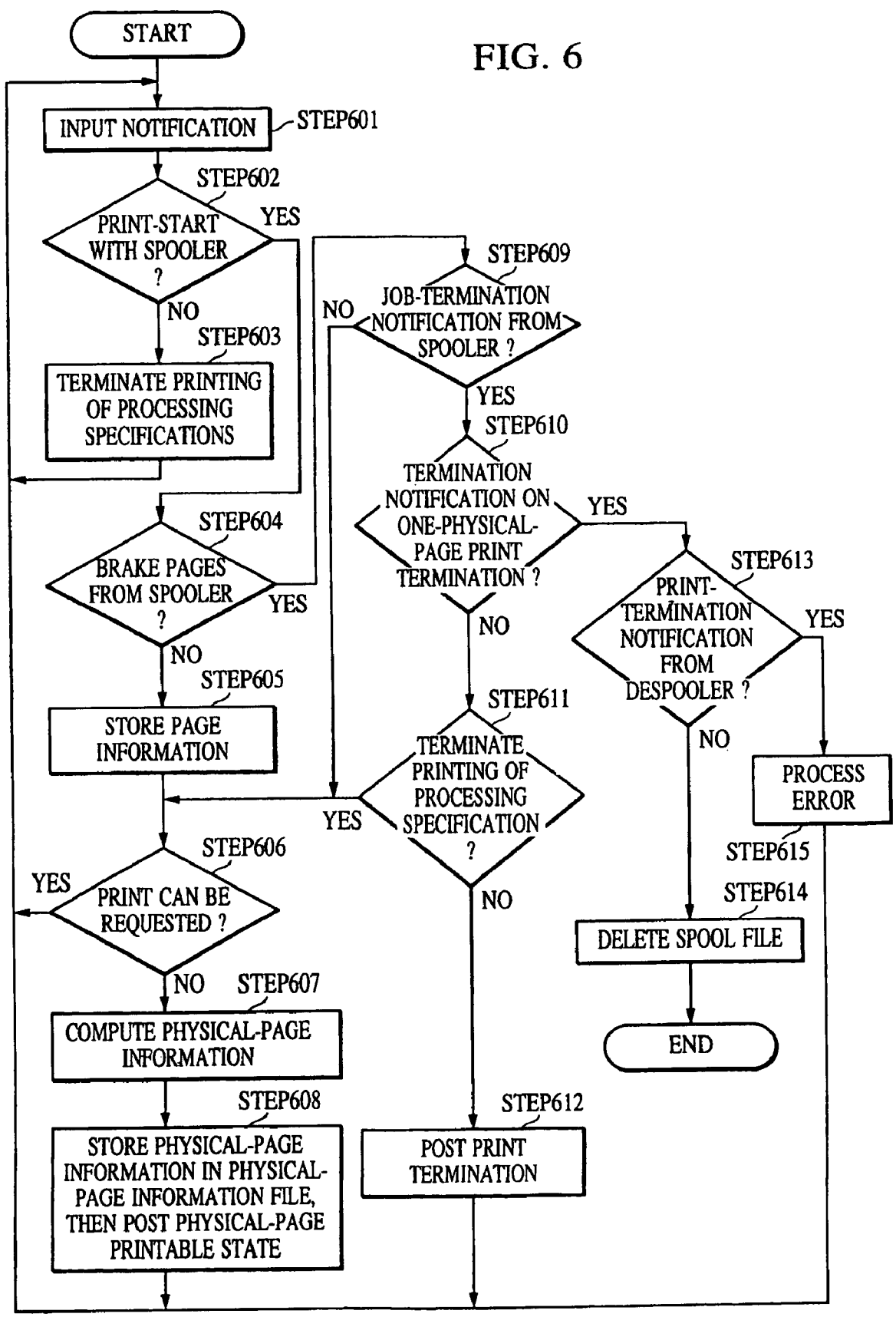
FIG. 6 is a flowchart of print control in a spool-file manager.

FIG. 6 is a flowchart showing control that is performed between processing for generating the spool file 303 and processing for generating print-data (described below) in the spool-file manager 304.

In step 601, the spool-file manager 304 receives a print request from one of the spooler 302 and the despooler 305.

In step 602, the spool-file manager 304 determines if the progress-status notification is a print-start notification posted in the described step 504 from the spooler 302. If the progress-status notification is determined to be the print-start notification, processing proceeds to step 603.

In step 603, the spool-file manager 304 reads the print-specification information (processing specifications for printing) from the spool file 303, thereby starting job control. On the other hand, if the progress-status notification is determined not to be the print-start notification posted from the spooler 302, processing proceeds to step 604.

In step 604, the spool-file manager 304 determines if the progress-status notification is a one-logical-page print-termination notification posted from the spooler 302 in the described step 508. If the progress-status notification is determined to be the one-logical-page print-termination notification, processing proceeds to step 605.

In step 605, the spool-file manager 304 stores logical-page information for the logical page.

In step 606, the spool-file manager 304 determines if printing of one physical page can be started for n logical pages of which spooling is completed at this time. If the spool-file manager 304 determines the physical page to be printable, the number of physical pages therefore is determined from the number of logical pages that are to be allocated.

Computation of physical pages is performed such that, in the case where, for example, 4-up printing is specified, the first physical page can be printed when the fourth logical page is spooled, and the second physical page can be printed when the eighth logical page is spooled. However, even in the case where the total number of logical pages is not a multiple of the number of logical pages to be allocated in one physical page, logical pages to be allocated in one physical page can be determined according to a spooling-termination notification posted in step 512.

In step 608, the spool-file manager 304 posts information to the despooler 305 in a format as shown in FIG. 10. The posted information includes the numbers of logical pages that configure the printable physical page and the number of the physical page. Concurrently, the spool-file manager 304 posts the print-specification information in the despooler 305. Thereafter, processing returns to step 604, in which the spool-file manager 304 awaits a notification.

In the first embodiment, inasmuch as logical pages that configure one page of print-data (that is, one physical page) are spooled, printing can be executed even when spooling of all the specified printing jobs is not completed.

In the described step 604, if the progress-status notification is determined not to be the one-logical-page print-termination notification posted from the spooler 302, processing proceeds to step 609. In step 609, the spool-file manager 304 determines if the progress-status notification is a job-termination notification posted from the spooler 302 in step 512. If the progress-status notification is determined to be the job-termination notification, processing proceeds to step 606. If the progress-status notification is determined not to be the job-termination notification, processing proceeds to step 610.

In step 610, the spool-file manager 304 determines if the received notification is a one-physical-page print-termination notification posted from the despooler 305. If the notification is determined to be the one-physical-page print-termination notification, processing proceeds to step 611.

In step 611, the spool-file manager 304 determines if printing for all the print-processing specifications is completed. If printing for all the print-processing specifications is completed, processing proceeds to step 612.

In step 612, the spool-file manager 304 posts a print-termination notification in the despooler 305. If printing for all the print-processing specifications is determined not to be completed, processing proceeds to step 606. In the first embodiment, the despooler 305 assumes the number of physical pages that can be concurrently printed to be one.

In the described step 608, the information required for one-physical-page printing is stored one by one as files so as to be reusable. In a case where the information need not be reusable, however, the configuration may be different. The configuration may be such that a medium that allows high-speed access, such as a shared memory, is used, and the information is successively overwritten in the memory in units of one physical page. This saves processing time and resources.

In addition, in a case where spooling progresses faster than despooling does and/or in a case where despooling is started after completion in spooling of all pages, the configuration may be different. For example, an alternative configuration may be such that page-printable-status notifications are not posted in units of one physical page. In this, notifications informing that either a plurality of the physical pages or all the physical pages are ready for printing are posted corresponding to the progress status on the despooling side. This configuration allows the number of notifications to be reduced.

In the described step 610, if the inputted (received) notification is determined not to be the one-physical-page print-termination notification posted from the despooler 305, processing proceeds to step 613.

In step 613, the spool-file manager 304 determines if the inputted notification is a print-termination notification from the despooler 305. If the notification is determined to be the print-termination notification, processing proceeds to step 614.

In step 614; the relevant spool file is deleted from the spool file 303. On the other hand; if the notification is determined not to be the print-termination notification, processing proceeds to step 615.

In step 615, other normal processing, such as error processing, is performed. Then, the spool-file manager 304 enters a state for awaiting a notification.

Figure 7:
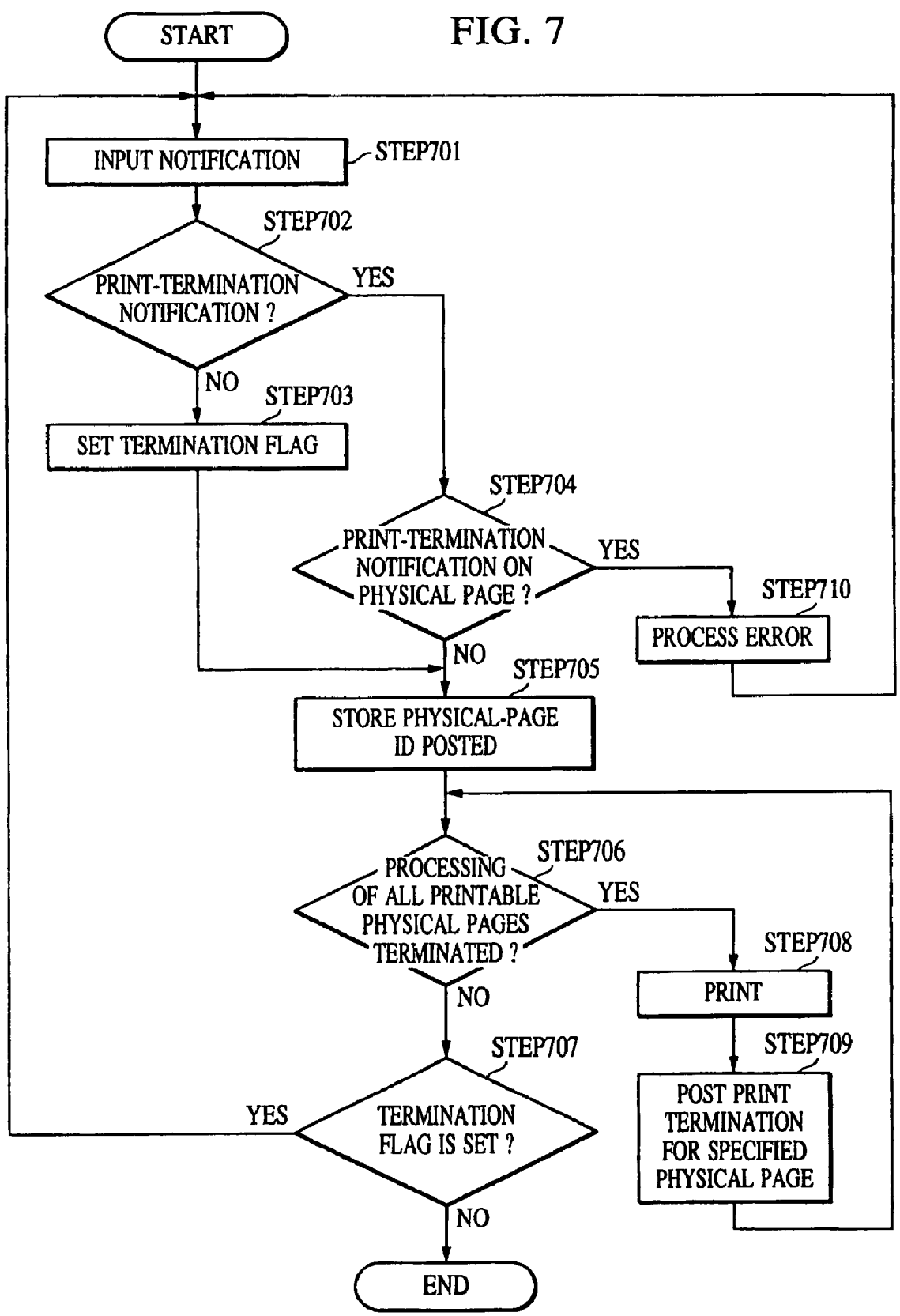
FIG. 7 is a flowchart of processing in a despooler.

FIG. 7 is a flowchart showing in detail print-data generating processing by the despooler 305.

In response to a print request from the spool-file manager 304, the despooler 305 reads out necessary information (the page description file and the job specification file). Based on the information, the spool-file manager 304 generates print-data. The method for transferring the print-data has already been described with reference to FIG. 3.

The print-data generation by the despooler 305 proceeds as described below.

In step 701, the aforementioned notification posted from the spool-file manager 304 is inputted.

In step 702, the despooler 305 determines if the inputted notification is the job-termination notification. If the notification is determined to be the job-termination notification, processing proceeds to step 703

In step 703, a termination flag is set (turned ON). Then, processing proceeds to step 705. If the notification is determined not to be the job-termination notification, processing proceeds to step 704.

In step 704, the despooler 305 determines if the one-physical-page print-start request in the described step 608 is posted. If the print-start notification is determined not to have been posted, processing proceeds to step 710.

In step 710, other processing, such as error processing, is performed; then, the despooler 305 enters a state for awaiting a notification. On the other hand, in step 704. If the one-physical-page print-start-request is determined to have been posted, processing proceeds to step 705.

In step 705, the despooler 305 stores an identifier (ID) of the printable physical page, regarding which the notification has been posted in the described step 704.

In step 706, the despooler 305 determines if printing is completed on all physical pages each having an ID stored in step 705. If printing is completed for all physical pages, processing proceeds to step 707.

In step 707, the despooler 305 determines if the termination flag is set (turned ON) in the described step 703. If the termination flag is determined to have been set, the despooler 305 assumes that printing for the jobs has been completed, and posts a notification regarding termination of processing by the despooler 305 in the spool-file manager 304. Then, the processing terminates. If the termination flag is determined not to have been set (turned OFF), processing control returns to step 701, in which the despooler 305 awaits a notification.

In the described step 706, the despooler 305 determines that physical pages still remain for printing, processing proceeds to step 708.

In step 702, the despooler 305 sequentially reads IDs of the remaining physical pages from the file that contains IDs of physical pages. Subsequently, the despooler 305 reads information required for the print-data generating processing of the physical pages corresponding to the IDs that have been read out. Then, the despooler 305 performs processing of the physical pages.

In the print processing, a print-request command is converted in the despooler 305 to be in a format (to a GDI function in the Windows® OS) that is recognizable by the graphics engine 202. Then, the converted command is transferred to the graphics engine 202. In the above conversion step of the first embodiment, the print-processing specification for printing multiple logical pages on one physical page (N-page printing or Nup printing) is converted in consideration of reduced layout.

Subsequent to completion of the required print processing, in step 709, a notification regarding termination: of generation of print-data for one physical page is posted in the spool-file manager 304. Then, processing control returns to step

706. The described print processing is repeated for each of the printable physical-page IDs stored in step 705.

The print processing flows as described above by using the dispatcher 301, the spooler 302, the spool-file manager 304, and the despooler 305. According to the described processing, the application 201 is relieved from the print processing with timing where the intermediate codes are generated by the spooler 302 and are stored in the spool file 303. Therefore, the processing can be completed faster than in the case where data is directly outputted to the printer driver 203.

Also, according to the described processing, data is temporarily stored as the intermediate files (the page description file and the job specification file) that include the print specifications set for the printer driver 203.

In addition, the processing allows a user to recognize previews of prints that would actually be produced. The processing also allows print jobs generated by multiple applications to be linked and rearranged.

Furthermore, the processing allows the user to modify print specifications without rebooting the application for printing.

In the print processing by using the spooler 302, the despooler 305 generates the job-outputting specification file when the print request is issued to the graphics engine 202. However, the job-outputting specification file is also generated when preview operations are performed, job linkage, or the like is performed. The job-outputting specification file is equivalent to the job specification file for a single job, and it is generated according to multiple job specification information for linked jobs.

Hereinbelow, a description will be given of the job specification file.

Mainly, the job specification file contains the contents of DEVMODE received via the printer driver 203. It is configured as shown in FIGS. 12 and 13.

First, the information includes a job ID determined by the name of files or the name of a shared memory that contains the information, and random numbers. The following includes multiple pieces of information on the output-form size, each combined with an ID for identification of the form size. The multiple pieces of the information are provided to allow the output form size to be modified in units of a physical page that follows. The size of the physical page is specified with the form size ID.

The following information relates to finishing and indicates which one of single-side printing, double-sided printing, and binding printing is specified. Also, there is included information indicating coordinate values of valid print areas and information that indicates whether previewing is specified.

The following is information that indicates the number of logical pages that are to be allocated in the physical page and that includes placement information indicating positions where the individual logical pages are placed. In addition, the information includes supplementary information such as watermarks, frames, dates, and user names.

Hereinbelow, a detailed description will be given of a preview system of the present invention.

FIG. 11 shows an example preview screen. As described above, specification of fields on the preview screen for the graphics engine 202 allows the screen to be displayed.

FIG. 12 shows example print information and print-specification information stored in the spool file 303. The stored information specifies requirements of an application, for example, whether to perform double-sided printing, and the number of pages to be reduced and allocated in one page.

Figure 28:
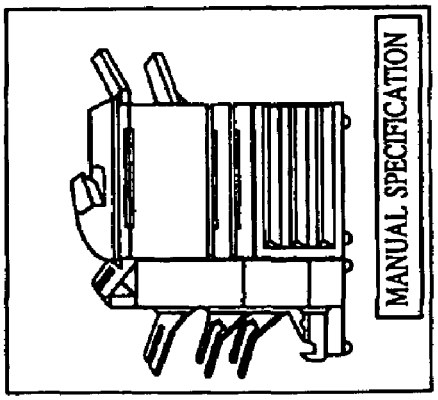
FIG. 28 shows a property screen controlled by the printer driver in a case where device information is fetched from the printer.

FIG. 13 is example device information sent from a printer driver. The device information may be stored in the spool file 303 in a format as shown in the example. The device information is retained in a printer-driver setup utility from the time when the device is delivered from a factory. An arrangement may be such that the device information is set under the OS at the time of installation of the printer driver. An alternative arrangement may be such that the device information is fetched in a manner that a client performs two-way communication with one of a printer and a print server with timing where an operator presses a "Gain Device Information" button as shown in a field 2801 in FIG. 28.

The method arranged such that where the device information is obtained in the manner that the printer driver performs two-way communication with the printer via a network or a two-way interface with timing where the "Gain Device Information" button is pressed improves usability of the device. The aforementioned method allows access to finishing functions in options connected to the device even in a case the finishing options are modified or new finishing options are added. This is advantageous because, recently, diversified finishing options are employed. This should be understood from, for example, just one case where options connectable to the image-processing unit "MEDIO600", a brand of Canon Inc., includes "Saddle Finisher C2", "Finisher C1", "Finisher E1", and "Multitray 3".

Also, in the present embodiment, any one of "Information on punched-hole positions" and "Information on stapling positions" is indicated in a printer coordinate system. The printer coordinate system has bits corresponding to resolutions of a device, that is, an image-processing unit; particularly, it has 600 dots per inch (dpi), in the present embodiment. In particular, for example, the punched-hole positions (X, Y) indicate positions of the X dots and Y dots.

In addition, in a case where the resolution is degraded because of memory shortage or the like, as a matter of course, it can be modified corresponding thereto. Thus, the present embodiment is furnished with the device information in the printer coordinate system. However, there are no restrictions thereto, and the positions may be indicated by physical distances from a reference point. For example, the information may be presented so as to indicate distances for positions (X cm, Y cm) from a reference point set in an upper left portion of a form.

Hereinbelow, a description will be given of operation of the preview system according to the present embodiment.

Figure 14:
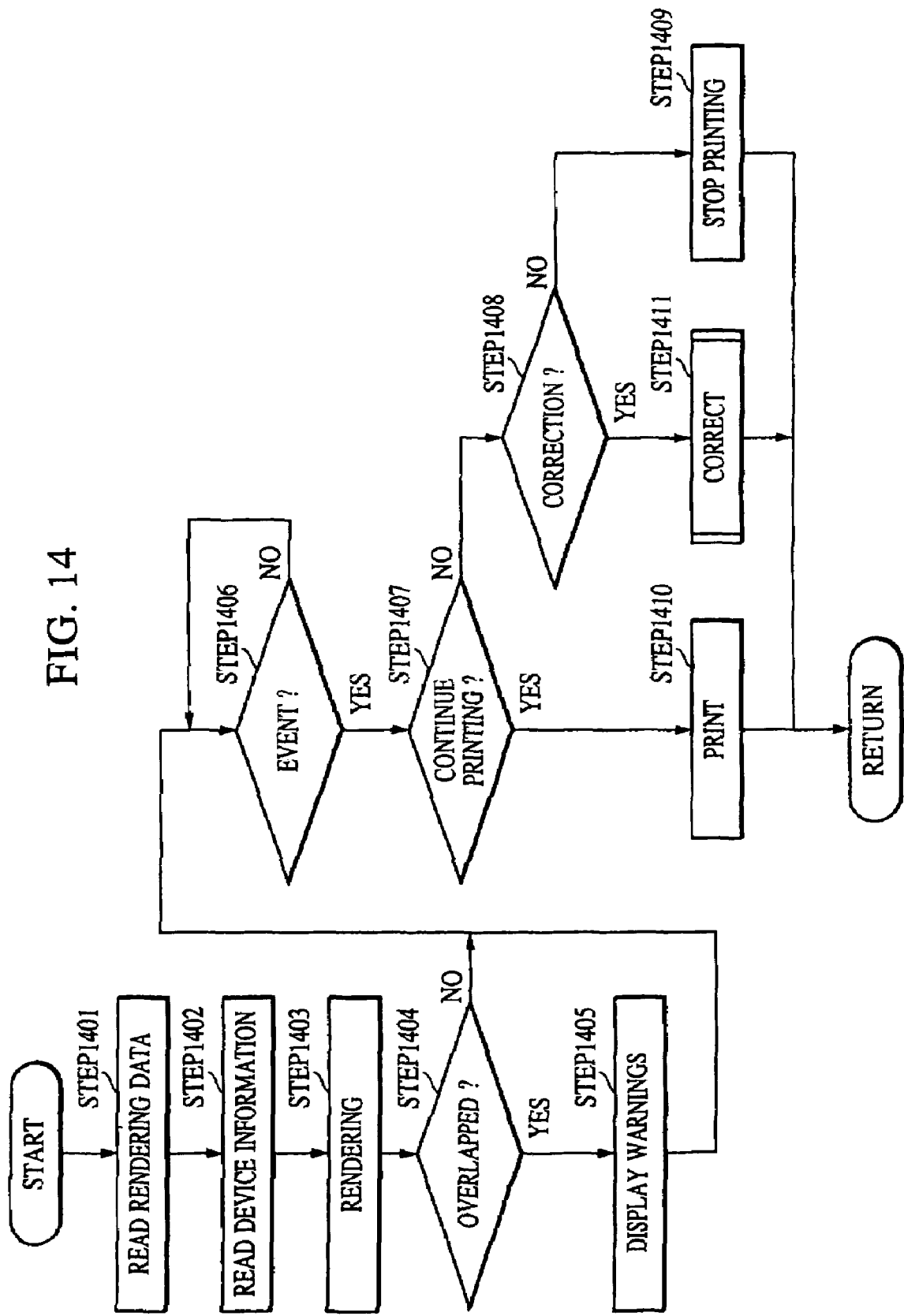
FIG. 14 is a flowchart of processing for issuing warnings against defects caused between rendering information and device information in preview operations.

FIG. 14 is a flowchart of processing that the previewer 306 performs to preview device information and rendering information.

In step 1401, the previewer 306 reads intermediate data, converted from rendering data, from an application stored in the spool file 303.

In step 1402, the previewer 306 reads the contents of the job specification file that includes print-specification information (as shown in FIG. 12) and device information (as shown in FIG. 13). Concurrently, the previewer 306 reads and the contents of the page description file. As described above, the device information is preset under the OS as a file. To acquire (set) the device information, there are two ways: a way to store the information at device-installation time, and a way to acquire the information directly from the device with timing where an operator specifies it.

In step 1403, according to the read-in contents of the job specification file in the described step, the previewer 306 performs rendering processing for the intermediate code stored in the page description file.

In this case, processing to be performed is such that processing associated with the despooler 305 is replaced with processing associated with the previewer 306 in the processing by the spool-file manager 304, which is shown in FIG. 6. Also, processing is such that the print processing for the printer in step 705 in the flow of processing by the despooler 305, shown in FIG. 7, is replaced with screen processing.

Specifically, the rendering processing to be performed by the previewer 306 flows as follows.

First, the previewer 306 reads the intermediate data of the page description file from the spool file 303 according to a notification posted from the spool-file manager 304. Then, the previewer 306 performs layout processing (for reduction, magnification, and placement order) according to the print-specification information in the job specification file. Subsequently, the previewer 306 converts the intermediate data fetched for one physical page to the GDI function interpretable by the graphics engine 202. Then, the previewer 306 uses an output device of the graphics engine 202, such as a CRT display, as a displaying means, and drives the graphics engine 202 to send out the DDI function to a display driver.

It is to be noted that the previewer 306 performs not only rendering processing and transfer of the GDI function as in the case of the despooler 305, but also rendering processing according to the device information.

In step 1404, according to coordinate information for the rendering data that is based on the intermediate data and coordinate information for the device information, the previewer 306 determines if the coordinates overlap with each other. If the previewer 306 detects an overlap in the coordinates, processing proceeds to step 1405. If the previewer 306 does not detect the overlap, processing proceeds to step to step 1406, and then, the previewer 306 awaits an event inputted by a user.

In the above, for example, suppose specifications as shown in the device information in FIG. 13 are set for punched holes for a print job being executed. In this case, positions of the punched holes can be determined in the printer coordinate system and the size of the punched holes according to the information on punched-hole positions and the information on punched-hole sizes. To perform the determination as described above, the previewer 306 is configured to determine if the coordinates overlap with each other according to positions in the coordinate system of the rendering data and positions of the punched holes. A similar determination is performed for stapling.

As described above, in the case where the device information is retained to include the physical distance, the physical distance is converted to be in the printer coordinate system. First, the unit of a centimeter is converted to the unit of an inch. Also, the inch unit is converted to the number of dots according to print resolutions set by the operator in a "Print Purpose" field of a display on the printer driver. In this case, "Document; Obverse" set for the "Print Purpose" represents a print resolution of 600 dpi, and "Quick Document; Obverse" represents a print resolution of 300 dpi.

In step 1404, if the overlap in the coordinates are detected, processing proceeds to step 1405.

Figure 16:
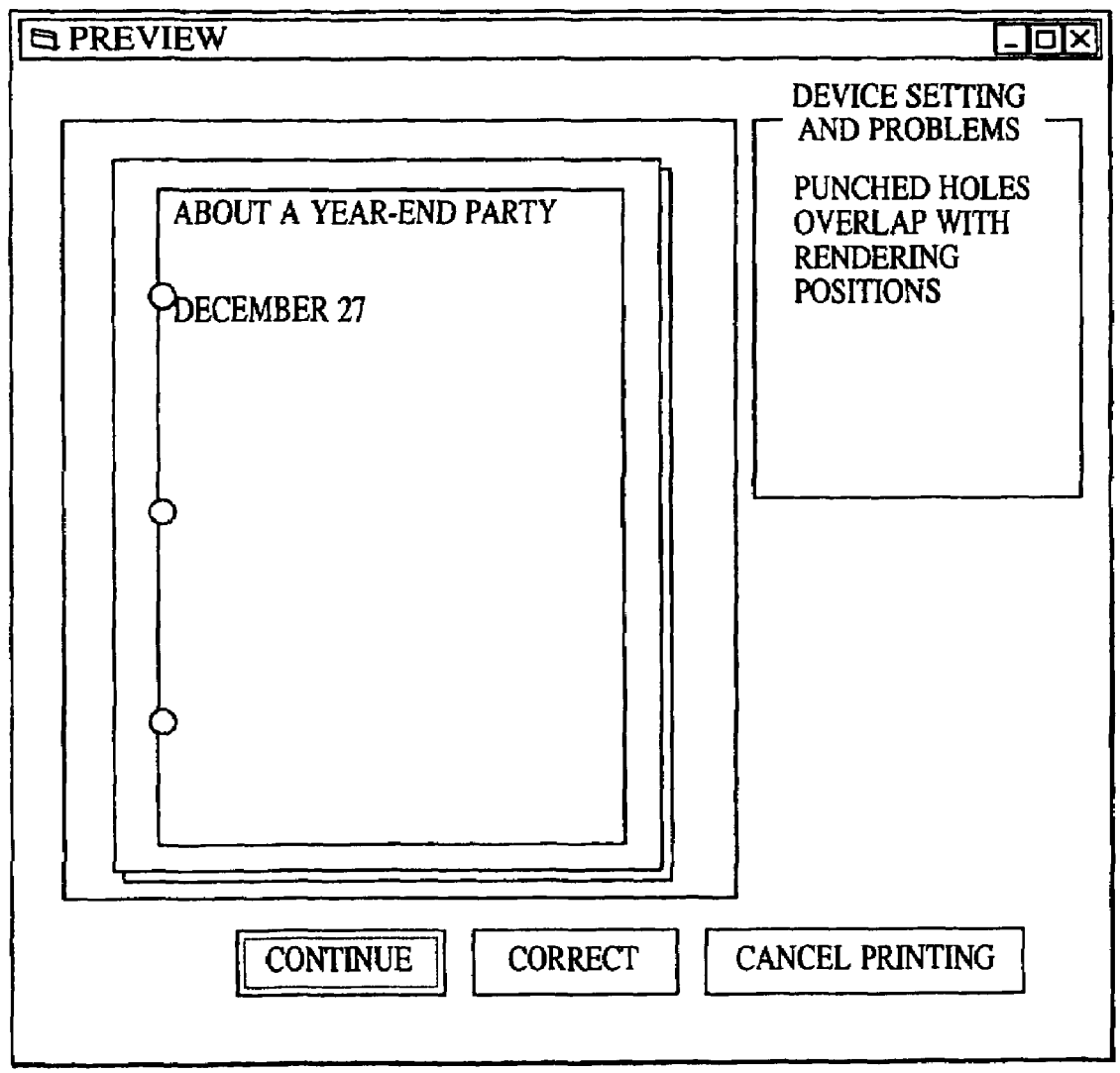
FIG. 16 shows an example warning dialog box.

In step 1405, the previewer 306 displays a warning dialog box as a defective specification. FIG. 16 shows an example display thereof, and the example provides options for print continuation, correction, and print cancellation.

In step 1406, the previewer 306 awaits an event inputted by the user. If an event is inputted, processing proceeds to step 1407.

In step 1407, if an event is determined for print continuation, processing proceeds to step 1410.

In step 1410, if the previewer 306 determines the event to be the print continuation, it posts a notification to that effect in the despooler 305. In response, the despooler 305 regenerates a GDI function from the intermediate data to perform printing. If the event inputted by the user is determined to be a different event, processing proceeds to step 1408.

In step 1408, if the event is determined to be correction, processing proceeds to step 1411.

In step 1411, the previewer 306 pops up a property screen controlled by the printer driver to allow the operator to perform correction processing thereon. The correction processing that the operator can perform includes cancellation of punching processing and stapling processing, modification of the form size, modification for Nup printing, and modification of print margins (upper, lower, right, and left margins). However, modification related to the rendering data is not permitted. That is, user-modifiable items are restricted to those in the print-specification information, which can be specified in the property screen controlled by the printer driver. To modify the rendering data, "Cancel" for print cancellation is selected.

In step 1408, if the event is determined to be different from the correction, processing proceeds to step 1409.

In step 1409, the event is assumed to be a request for print cancellation, and processing by the printer driver is cancelled.

In the present embodiment, of course the printer driver refers to the printer driver 203 that outputs the PDL from the DDI function to the printer 1500. However, the printer driver includes modules that allow previewing that reflects considerations for the device information, that is, the spooler 302, the spool-file manager 304, the despooler 305, and previewer 306. In this, portions that are provided by the printer driver vendors to the OS are generally referred to as the printer driver.

In addition, each of the dispatcher 301, the spooler 302, the spool-file manager 304, the despooler 305, and the previewer 306 can be distributed as an independent software product. However, a portion of each of these devices for which the device information is acquired must be linked with the printer driver.

In addition, an arrangement may be such that the preview functions of the present invention are implemented after processing by the printer driver 203. To perform the correction and the print cancellation, however, it is more effective than in the above arrangement to implement the preview functions before the rendering data is passed to the printer driver 203.

In addition, even in developing stages, the printer driver 203 is relied upon by languages. Recently, in the case of printers produced by Canon Inc., two languages levels, LIPS III and LIPS IV, are used; and also, languages such as PCL, ESC/P, ESC/Page, and Postscript are used. Under these circumstances, development of modules that allows preview functions to be implemented for the individual languages does not make sense in view of development costs.

However, the configuration in which the preview functions are implemented before the rendering data is passed to the printer driver 203 requires only OS-level development. This is very effective. The reason for this is that, as for the OS, at present, development related to Windows 95®, Windows 98®, and Windows NT® produced by Microsoft Corp., OS8® and Linux® produced by Apple Computer, Inc., and the like, eliminates inter-printer-language problems.

Figure 15:
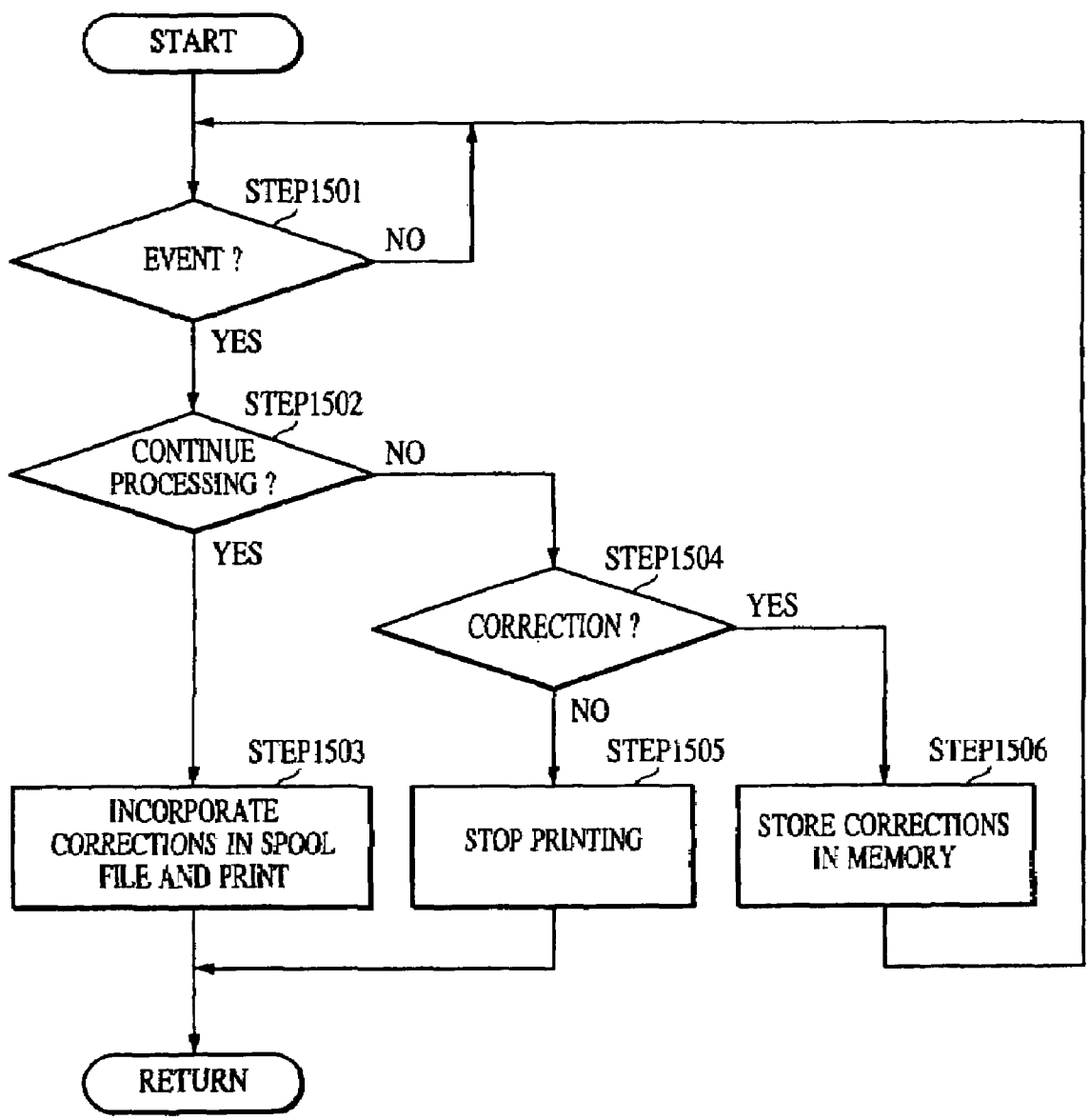
FIG. 15 is a flowchart of example defect-correcting processing.

FIG. 15 is a detailed flowchart of the correction processing in step 1408 in FIG. 14.

First, in step 1501, the previewer 306 awaits an event inputted from a user. As described above, at this stage, the property screen controlled by the printer driver is displayed. On the screen, buttons such as a "Correct" button are grayed out as invalid buttons.

In step 1502, in the property screen controlled by the printer driver, as shown in FIG. 27, when an "OK" button 2705 is pressed by an operator using a pointing device, such as a mouse, the previewer 306 determines the input to be a request for print continuation. Then, the processing proceeds to step to step 1503.

In step 1503, the previewer 306 updates corrected contents stored in a memory (to be described below). Then, the spool file 303 stores the updated contents, and the contents are printed. Thereafter, processing returns to step 1501, and the previewer 306 awaits an event to be inputted by the user.

In step 1504, in the property screen controlled by the printer driver, as shown in FIG. 27, when an "Update" button. 2707 is pressed in the manner mentioned above, the previewer 306 determines the input to be a correction-related event, and processing proceeds to step 1506.

In step 1506, the previewer 306 fetches print-specification information as set in the property screen controlled by the printer driver, shown in FIG. 27, from the printer-driver 203. Then, the spool file 303 stores the fetched print-specification information; thereby, print-specification information previously stored is updated.

In step 1504, if the input is determined not to be a correction-related event, for example, when a "Cancel" button 2706 in the property screen, as shown in FIG. 27, is pressed, processing proceeds to step 1505.

In step 1505, the previewer 306 determines the input to be print cancellation; therefore, it does not perform processing for printing.

As described above, in the preview system, when the device information and the rendering information are concurrently previewed, and a defect is detected, warning is issued to allow correction to be performed. Thereby, the preview system can produce outputs that meet requirements set by the user.

Second Embodiment

Hereinbelow, a description will be given of a second embodiment according to the present invention. In the second embodiment, a description will be given of processing to be performed by a preview system when printing is performed for a double-sided-printable device.

The configuration of the second embodiment is the same as described in the first embodiment. Therefore, a description of hardware and software configurations will be omitted. Also, the same reference symbols as used in the first embodiment are used in the description given below.

As shown in FIG. 12 for the first embodiment, the print-specification information includes a specification to allow determination to be made whether to perform double-sided printing.

Figure 17:
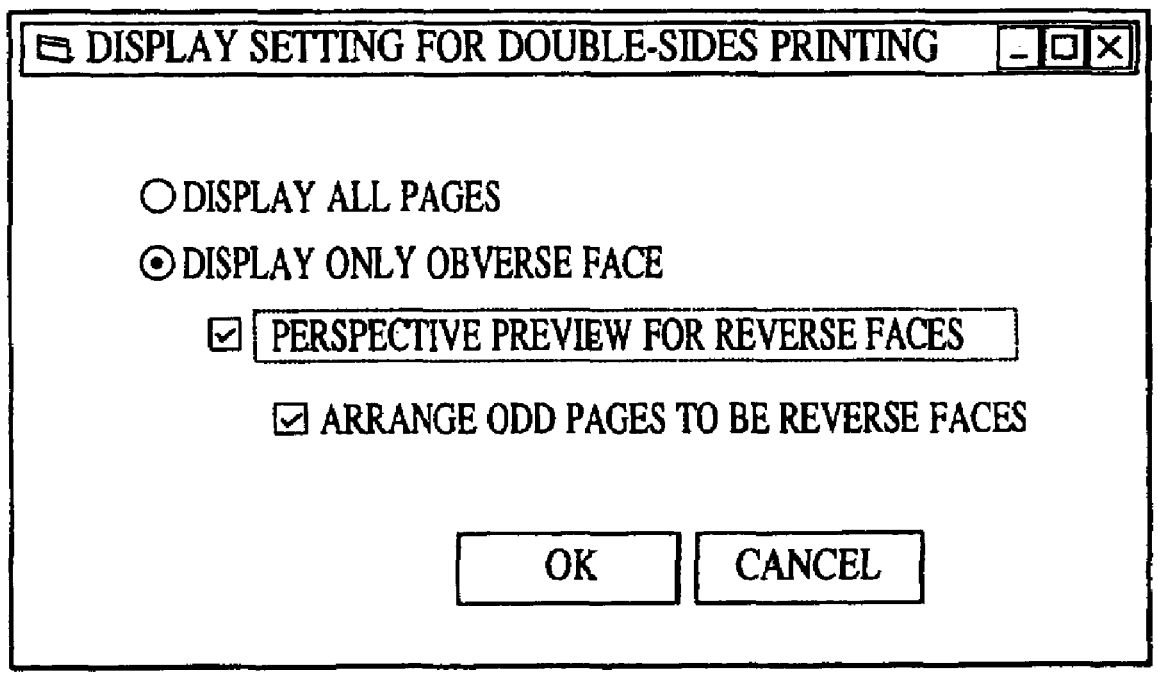
FIG. 17 shows an example dialog box for specifying the type of display for print-data for which double-sided printing is performed by a previewer.

FIG. 17 shows an example dialog box that allows specifications to be set for contents of displays for print-data, according to which the previewer 306 performs double-sided printing. The dialog box shown in the figure may be arranged to allow specifications to be set from the graphics engine 202. In this case, specification contents are stored as variables of print specifications as shown in FIG. 12. Also, the dialog box allows an on-screen specification to be made from the previewer 306. In this case, when preview operations are performed, the dialog box shown in FIG. 12 is displayed by the previewer 306 to allow an operator to set specifications. In the second embodiment, a description will be given on an assumption that the aforementioned on-screen specification is performed from the previewer 306.

FIGS. 18A to 18E show screens displayed corresponding to specifications set on the screen shown in FIG. 17.

Figure 18A:
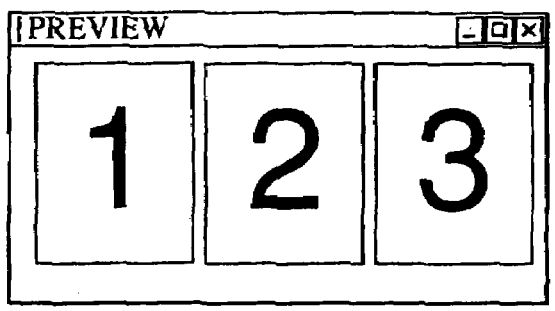
FIGS. 18A to 18E individually show example preview images to be displayed in display sections of the information-processing apparatus.

FIG. 18A is a screen displayed in response to selection of "Display All Pages" on the screen shown in FIG. 17. In this case, although the reverse face is displayed as if it were a different form, all the pages can be displayed. When "Display All Pages" is selected, other option fields are grayed out so as not to permit selection.

Figure 18D:
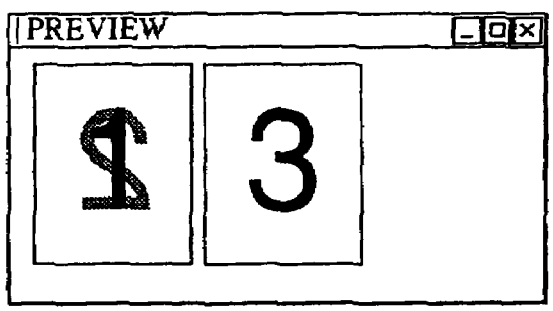
Figure 18B:
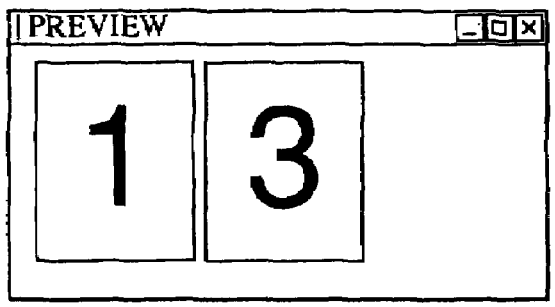

FIG. 18B is a screen displayed when "Display Only Obverse Face" is selected, "Perspective Preview for Reverse Faces" is not selected, and "Arrange Odd Pages to be Reverse Faces" is selected on the screen shown in FIG. 17.

Figure 18E:
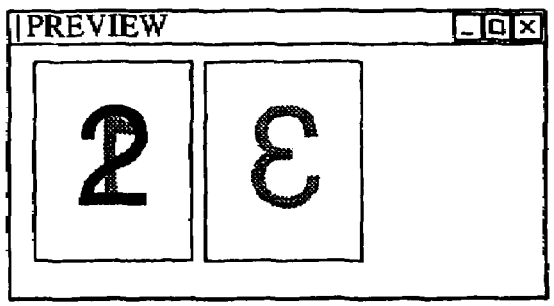
Figure 18C:
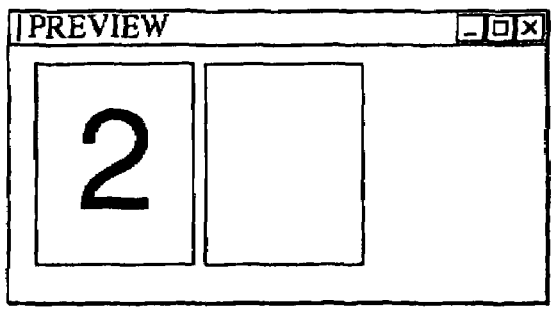

FIG. 18C is a screen displayed when "Display Only Obverse Face" is selected, but "Perspective Preview for Reverse Faces" and "Arrange Odd Pages to be Reverse Faces" are not selected on the screen shown in FIG. 17.

FIG. 18D is a screen displayed when "Display Only Obverse Face", "Perspective Preview for Reverse Faces", and "Arrange Odd Pages to be Reverse Faces" are concurrently selected on the screen shown in FIG. 17.

FIG. 18E is a screen displayed when "Display Only Obverse Face" and "Perspective Preview for Reverse Faces" are concurrently selected, but "Arrange Odd Pages to be Reverse Faces" is not selected on the screen shown in FIG. 17.

As above, when "Display Only Obverse Face" is selected, "Perspective Preview for Reverse Faces" and "Arrange Odd Pages to be Reverse Faces" may be concurrently selected on the screen shown in FIG. 17.

FIG. 19 is a table showing relationships between the individual options and FIGS. 18A to 18E when the "Display All Pages" option is OFF.

Figure 20:
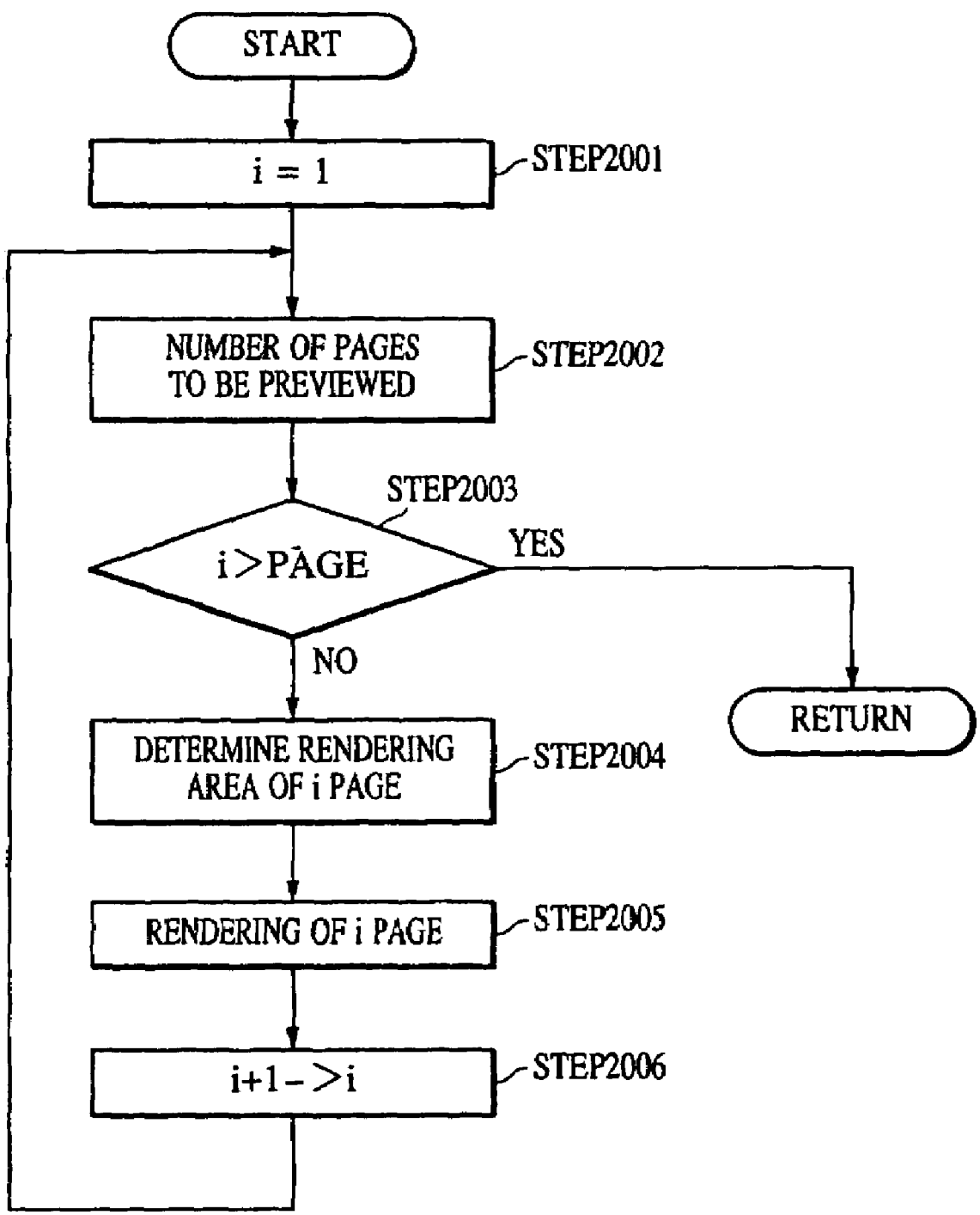
FIG. 20 is a flowchart of processing for displaying the image in FIG. 18A.

FIG. 20 is a flowchart of processing for displaying the screen shown in FIG. 18A.

In step 2001, the previewer 306 sets counter "i" to "1".

In step 2002, the previewer 306 inputs the number of pages of a print job according to print-specification information.

In step 2003, the previewer 306 determines if counter "i" exceeds the number of the pages. If counter "i" exceeds the number of the pages, the previewer 306 determines preview processing to have been terminated, and processing exits the routine. If counter "i" does not yet exceed the number of the pages, processing proceeds to step 2004.

In step 2004, the previewer 306 determines a rendering area of the i-th page in a preview screen.

In step 2005, the previewer 306 performs rendering of the i-th page in the rendering area. As described in the first embodiment, the rendering processing is performed such that the intermediate data read out from the spool file 303 is converted to a GDI function, and the GDI function is outputted to the graphics engine 202.

In step 2006, the previewer 306 increments counter "i" by one. Then, the previewer 306 returns processing control to step 2002 and subsequently performs preview processing that follows.

Figure 21:
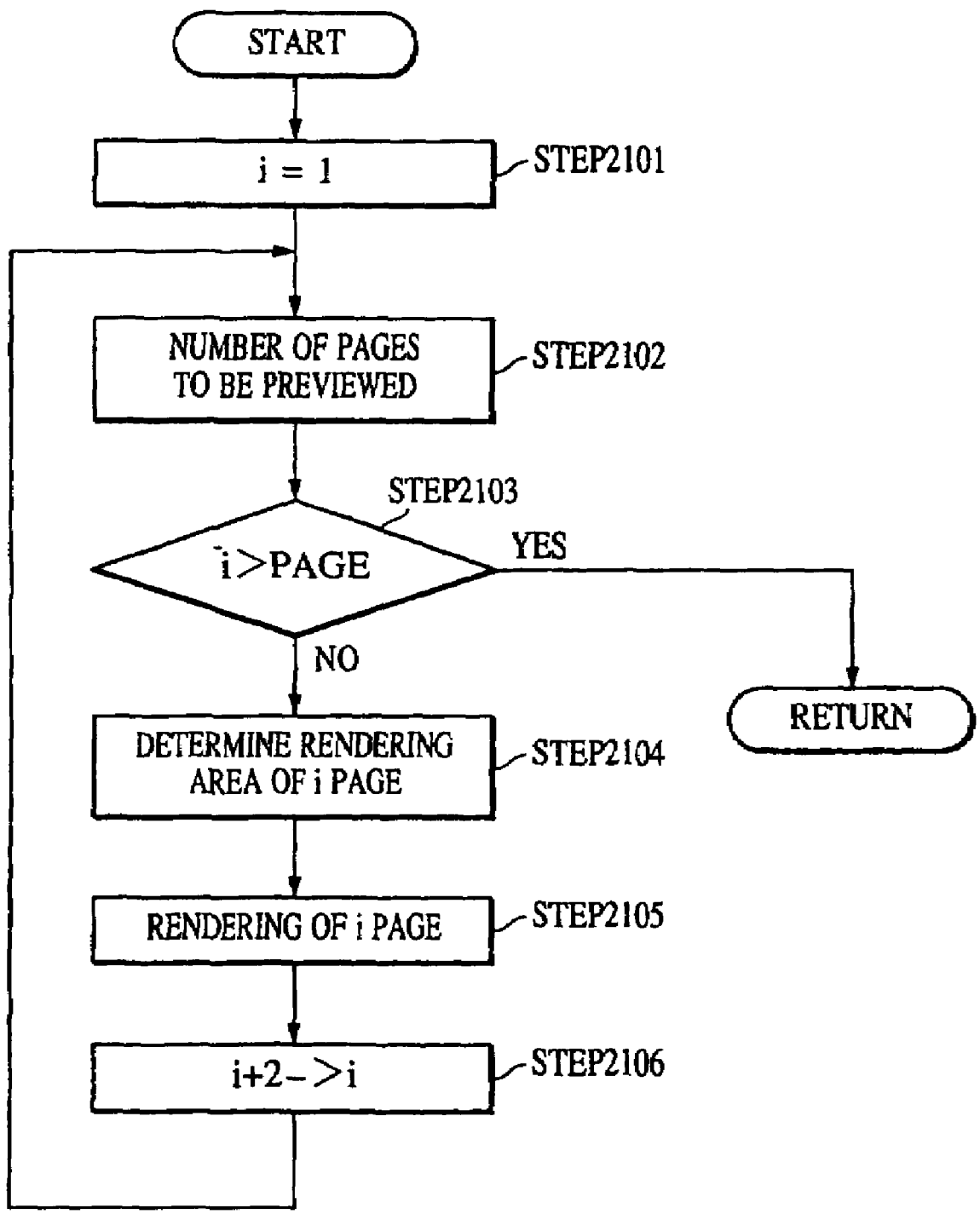
FIG. 21 is a flowchart of processing for displaying the image in FIG. 18B.

FIG. 21 is a flowchart of processing for displaying the screen shown in FIG. 18B.

In step 2101, the previewer 306 sets counter "i" to "1".

In step 2102, the previewer 306 inputs the number of pages of a print job according to print-specification information.

In step 2103, the previewer 306 determines if counter "i" exceeds the number of the pages. If counter "i" exceeds the number of the pages, the previewer 306 determines preview processing to have been terminated, and processing exits the routine. If counter "i" does not yet exceed the number of the pages, processing proceeds to step 2104.

In step 2104, the previewer 306 determines a rendering area of the i-th page in a preview screen.

In step 2105, the previewer 306 performs rendering of the i-th page in the rendering area.

In step 2106, the previewer 306 increments counter "i" by two. Then, the previewer 306 returns processing control to step 2102 and subsequently performs preview processing for the odd-number page.

Figure 22:
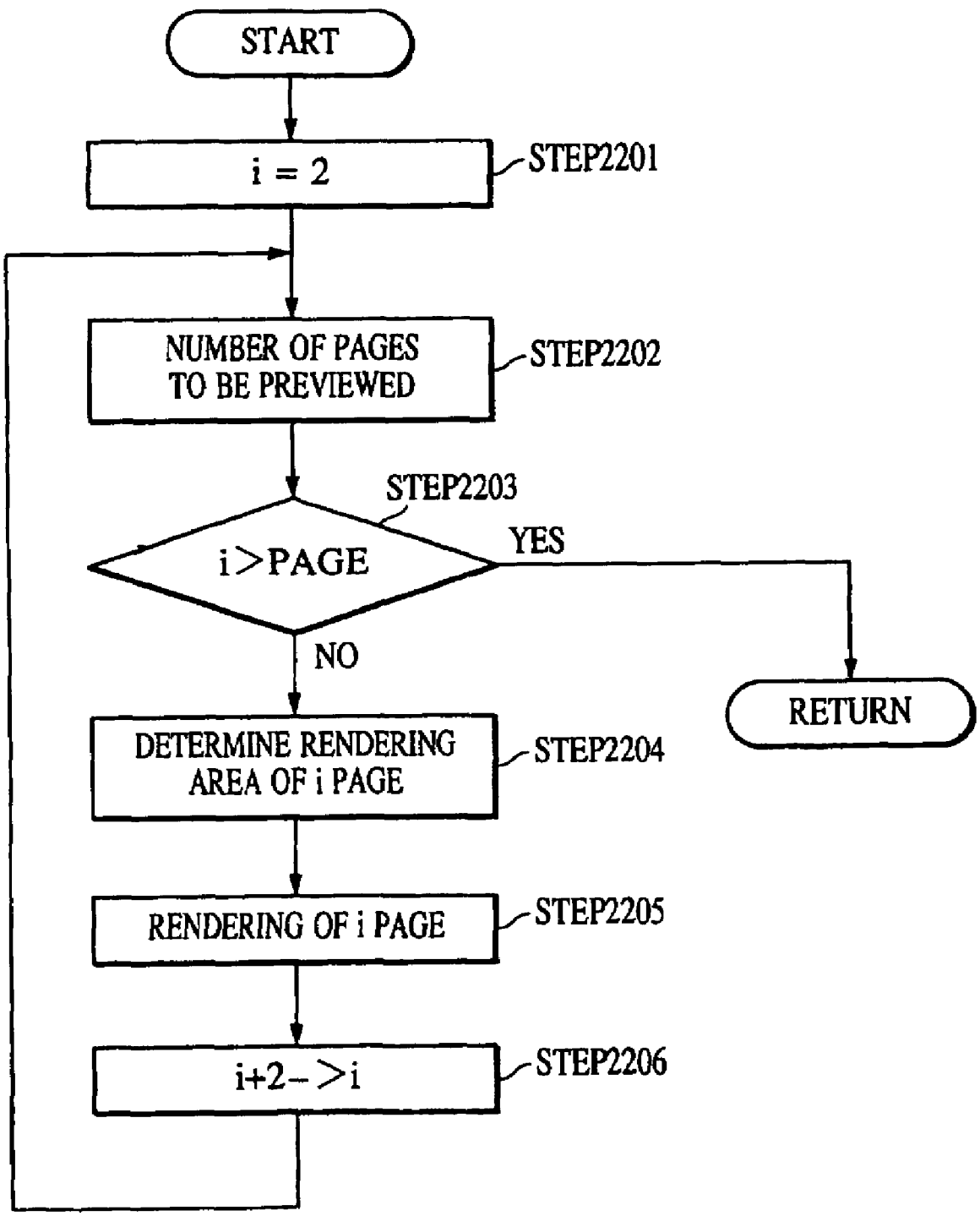
FIG. 22 is a flowchart of processing for displaying the image in FIG. 18C.

FIG. 22 is a flowchart of processing for displaying the screen-shown in FIG. 18C.

In step 2201, the previewer 306 sets counter "i" to "1".

In step 2202, the previewer 306 inputs the number of pages of a print job according to print-specification information.

In step 2203, the previewer 306 determines if counter "i" exceeds the number of the pages. If counter "i" exceeds the number of the pages, the previewer 306 determines preview processing to have been terminated, and processing exits the routine. If counter "i" does not yet exceed the number of the pages, processing proceeds to step 2204.

In step 2204, the previewer 306 determines a rendering area of the i-th page in a preview screen.

In step 2205, the previewer 306 performs rendering of the i-th page in the rendering area.

In step 2206, the previewer 306 increments counter "i" by two. Then, the previewer 306 returns processing control to step 2202 and subsequently performs preview processing for the even-number page.

Figure 23:
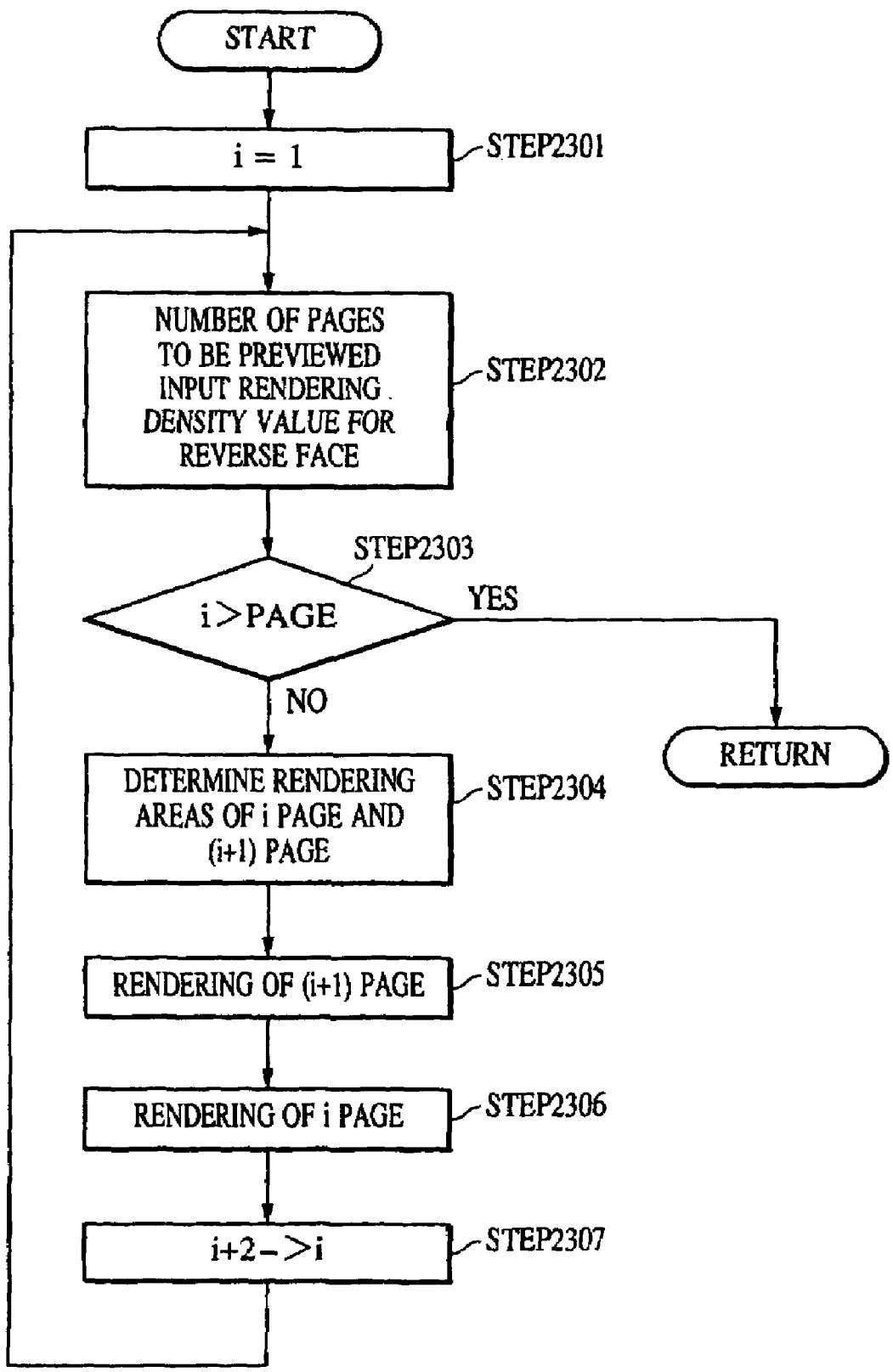
FIG. 23 is a flowchart of processing for displaying the image in FIG. 18D.

FIG. 23 is a flowchart of processing for displaying the screen shown in FIG. 18D.

In step 2301, the previewer 306 sets counter "i" to "1".

Figure 25:
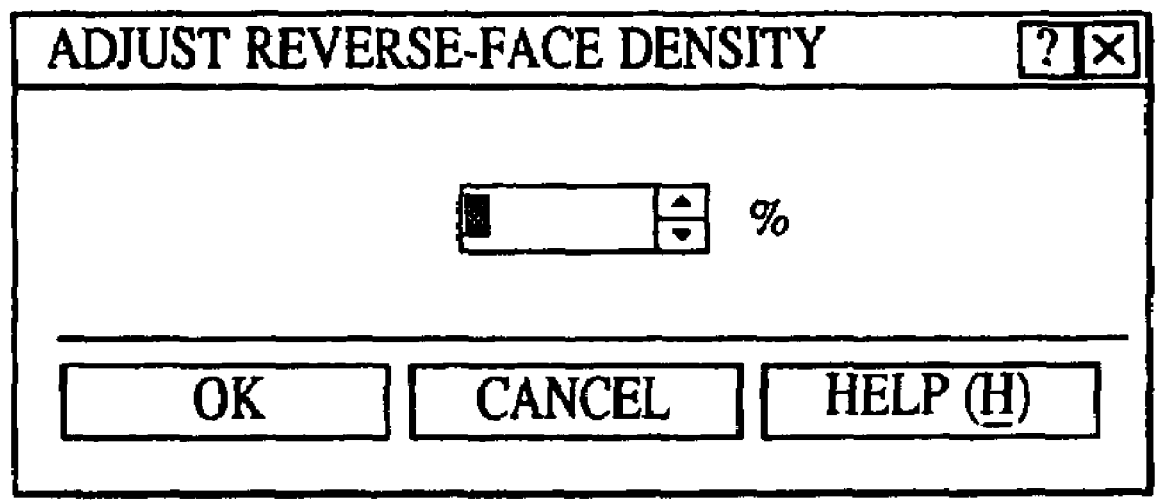
FIG. 25 is an example dialog box for specifying density adjustment for reverse-face previews.

In step 2302, the previewer 306 inputs the number of pages of a print job according to print-specification information. In addition, the previewer 306 inputs a rendering density value for the reverse face, which was specified on a density-adjustment dialog box shown in FIG. 25. The density-adjustment dialog box in FIG. 25 is displayed when the operator ticks "Perspective Preview for Reverse Faces" and presses "OK" button in the display-specification dialog box shown in FIG. 17, which is used in double-sided printing.

In step 2303, the previewer 306 determines if counter "i" exceeds the number of the pages. If counter "i" exceeds the number of the pages, the previewer 306 determines preview processing to have been terminated, and processing exits the routine. If counter "i" does not yet exceed the number of the pages, processing proceeds to step 2304.

In step 2304, the previewer 306 determines rendering areas of the i-th page and the (i+1)-th page in a preview screen. These rendering areas are at the same coordinate.

In step 2305, the previewer 306 performs rendering of the (i+1)-th page in the rendering area. In this case, reversed rendering is performed at a reduced density. When the rendering data is regenerated from the intermediate data, reversing processing produces an output to the graphics engine 202, the output including additions of a command for directing the reversal and a density command that is based on the rendering density value.

In step 2306, the previewer 306 performs rendering of the i-th page in the rendering area. In this case, over-rendering is performed in the same area as for the (i+1)-th page. Therefore, in the i-th page, over-rendering is performed so as not to allow rendering of the (i+1)-th page on a coordinate without a rendering image.

In step 2307, the previewer 306 increments counter "i" by two. Then, the previewer 306 returns processing control to step 2302 and subsequently performs a preview processing for the next page.

Figure 24:
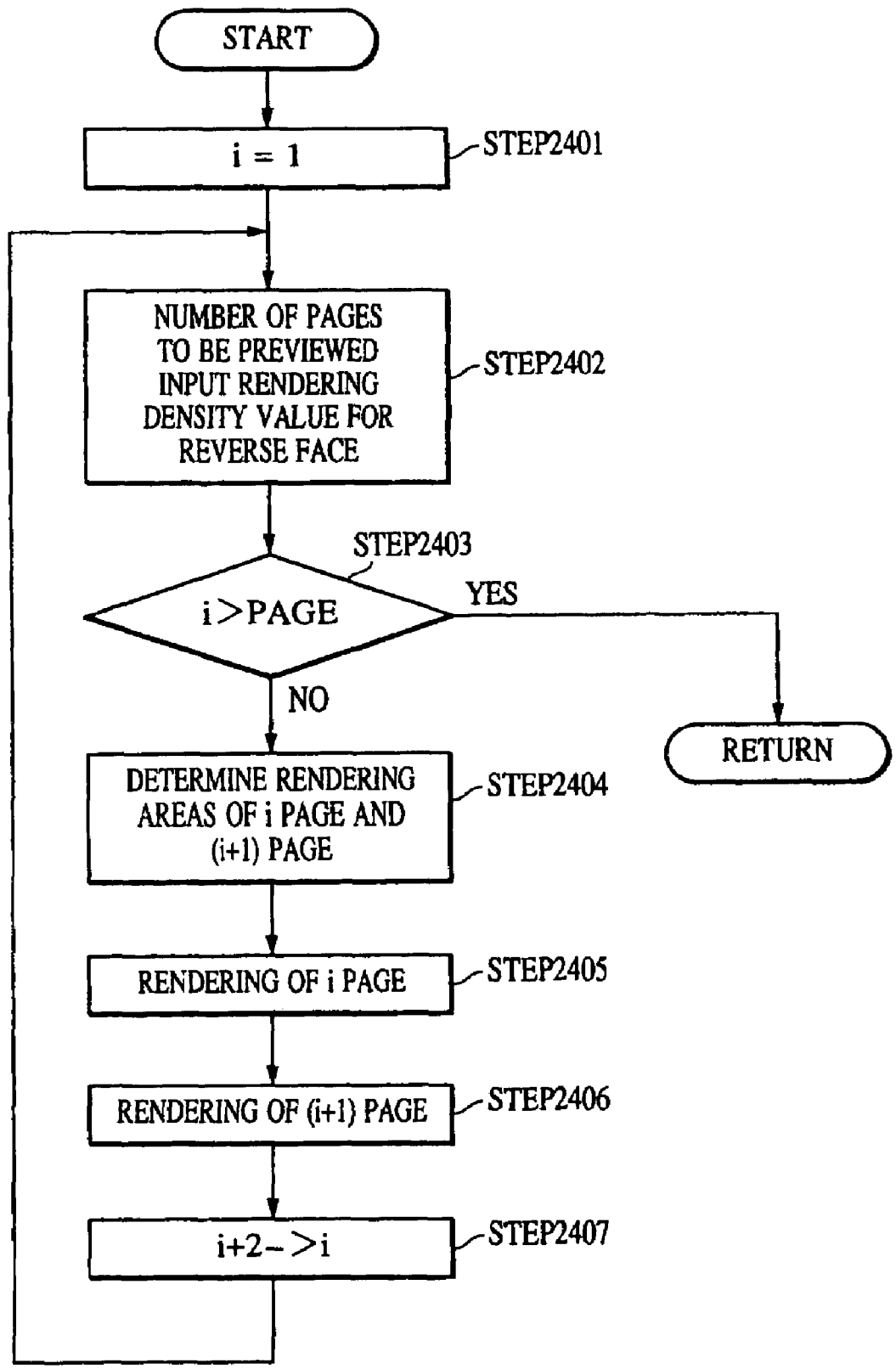
FIG. 24 is a flowchart of processing for displaying the image in FIG. 18E.

FIG. 24 is a flowchart of processing for displaying the screen shown in FIG. 18E.

In step 2401, the previewer 306 sets counter "i" to "1".

In step 2402, the previewer 306 inputs the number of pages of a print job according to print-specification information. In addition, the previewer 306 inputs a rendering density value for the reverse face, which was specified on a density-adjustment dialog box shown in FIG. 25.

In step 2403, the previewer 306 determines if counter "i" exceeds the number of the pages. If counter "i" exceeds the number of the pages, the previewer 306 determines preview processing to have been terminated, and processing exits the routine. If counter "i" does not yet exceed the number of the pages, processing proceeds to step 2404.

In step 2404, the previewer 306 determines rendering areas of the i-th page and the (i+1)-th page in a preview screen. These rendering areas are at the same coordinate.

In step 2405, the previewer 306 performs rendering of the i-th page in the rendering area. In this case, reversed rendering is performed at a reduced density.

In step 2406, the previewer 306 performs rendering of the (i+1)-th page in the rendering area. In this case, over-rendering is performed in the same area as for the (i+1)-th page. Therefore, in the (i+1)-th page, over-rendering is performed so as not to delete the rendered image of the i-th page on a coordinate without a rendering image.

In step 2407, the previewer 306 increments counter "i" by two. Then, the previewer 306 returns processing control to step 2402 and subsequently performs preview processing for the next page.

The above described processing allows the provision of multiple displaying methods for preview in double-sided printing.

The above-described first embodiment and the second embodiment are in the case where, in the properties of the printer driver, either "Preview" or "Store" is selected for the option 803 for the output destination. Hereinbelow, a supplementary description will be given of a case where "Store" is selected for the option 803.

As described above, with the specification of "Store" for the output destination, when the page description file and the job specification file are stored in the spool file 303 as the intermediate data, a window screen as shown in FIG. 9 of the spool-file manager 304 is popped up. A window 903 displays, the name of a file spooled as the intermediate data (in the page description file and the in job specification file) is list-displayed. When a cursor is moved close to an icon where the filename is list-displayed, an overlap of the cursor and the icon is detected. If the overlap is detected, job-specification information is displayed near the icon. On the screen in FIG. 9, it can be known that "Job1" is printed with the specifications set as "600 dpi, 1 Page per Sheet, 1-Sided Printing". Also, it can be known that the number of pages to be printed is eight.

When "Edit" is selected on the screen, a user-interface screen as shown in FIG. 29 appears. In the figure, the job name is variable in the field 2901 of "Job Name". Windows 2902 displays small preview images. The small preview images are also generated by the previewer 306. The preview images are displayed corresponding to the counted number of required forms (physical pages). In the figure, "Job1" requires forms (sheets) for eight pages.

Figure 32:
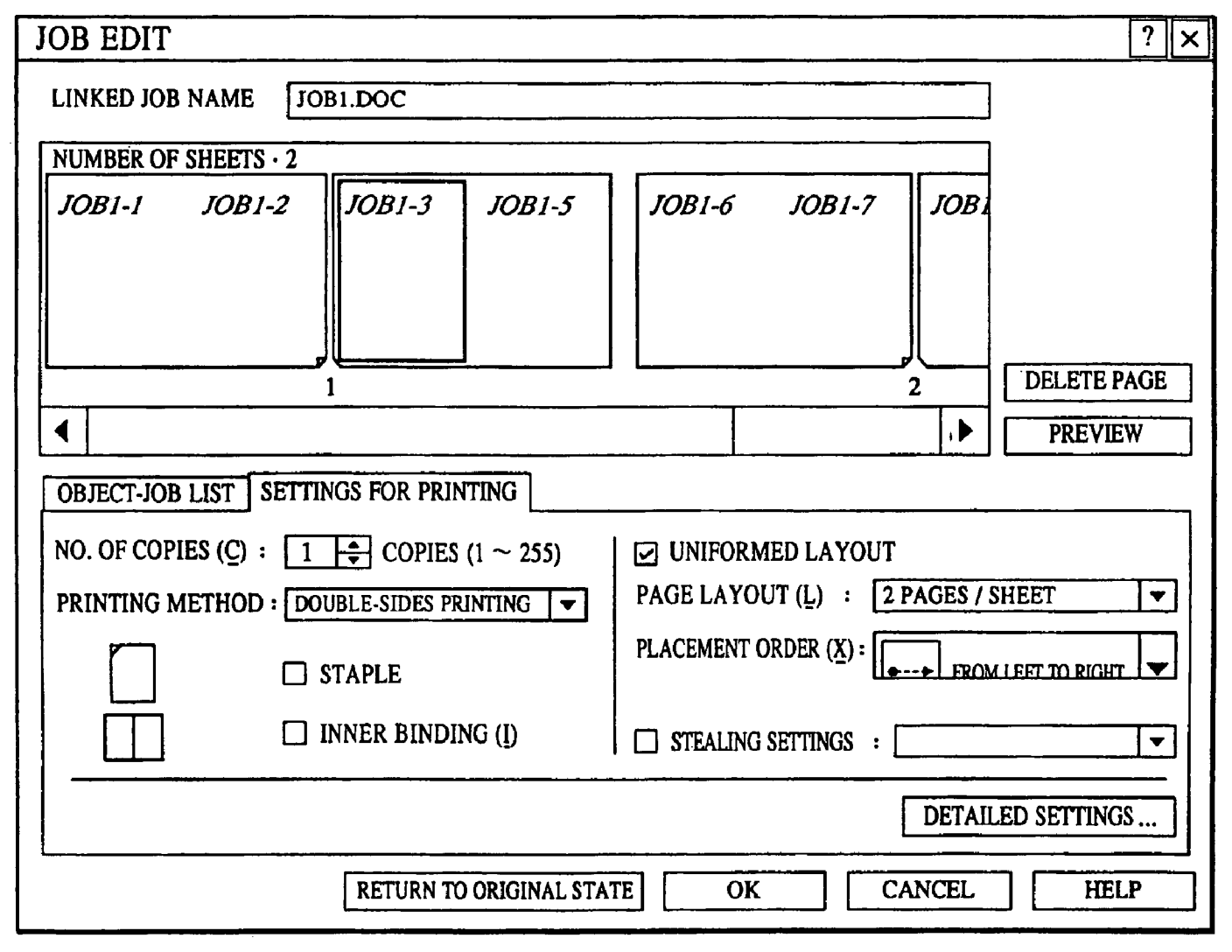

A "Delete Page" 2903 is used to delete a specified page. When it is pressed by, for example, a user, a page-specified in a window 2902 is deleted. As shown in the portion of "Job1-3" in FIG. 32, the page specified therein is shown in a frame; thereby, the user can recognize the specified page. In FIG. 32, page "Job1-4" was deleted.

Thus, a logical page is deleted on the preview screen. However, the page is not actually deleted from the page description file. Actual deletion of the page is implemented such that a job-outputting file is generated by copying the job specification file, and numbers of logical pages used in the job specification file are changed. This allows the deleted logical page to be restored in response to a command issued by pressing the "Return to Original State" button.

A "Preview" button is used to display a preview screen. When it is pressed by the user, a large preview screen as shown in FIG. 29 is displayed. In this case, the preview creation method is the same as in the case of the individual small preview images, except for magnification.

A pull-down menu 2905 is used to select a printing method. It allows selection of any one of "Single-Side Printing", "Double-Sided printing", and "Binding-Printing". FIG. 29 shows a preview when "Single-Side Printing" is specified as the printing method. When the method is changed by selection of "Double-Sided printing", the screen automatically shifts to a preview screen as shown in FIG. 30. As shown in FIG. 30, for identification of "Double-Sided printing", forms are displayed such that the lower-right corner of the obverse face of the form is folded frontward, and the lower-left corner of the reverse face of the form is folded backward.

In addition, since the number of forms (sheets) is reduced to be a half, the number of forms is displayed between the obverse face and the reverse face of each of the forms. This is realized as follows.

In preview processing by the previewer 306, job-specification information and the page description file are read out, and a GDI function is outputted to the graphics engine 202. At this time, print specifications set on "Job Edit" window screen (FIG. 29) of the spool-file manager 304 are fetched from the spool-file manager 304; and when double-sided printing is performed, the page count is reduced to be a half.

Alternatively, display of the number of the forms can be implemented as follows.

A copy file of the job specification file is generated each time print specifications are modified on the window screen controlled by the spool-file manager 304. Then, modified specifications are overwritten to the original specifications in the file, and the job specification file containing the modified specifications is read by the previewer 306 at preview time.

Figure 31:
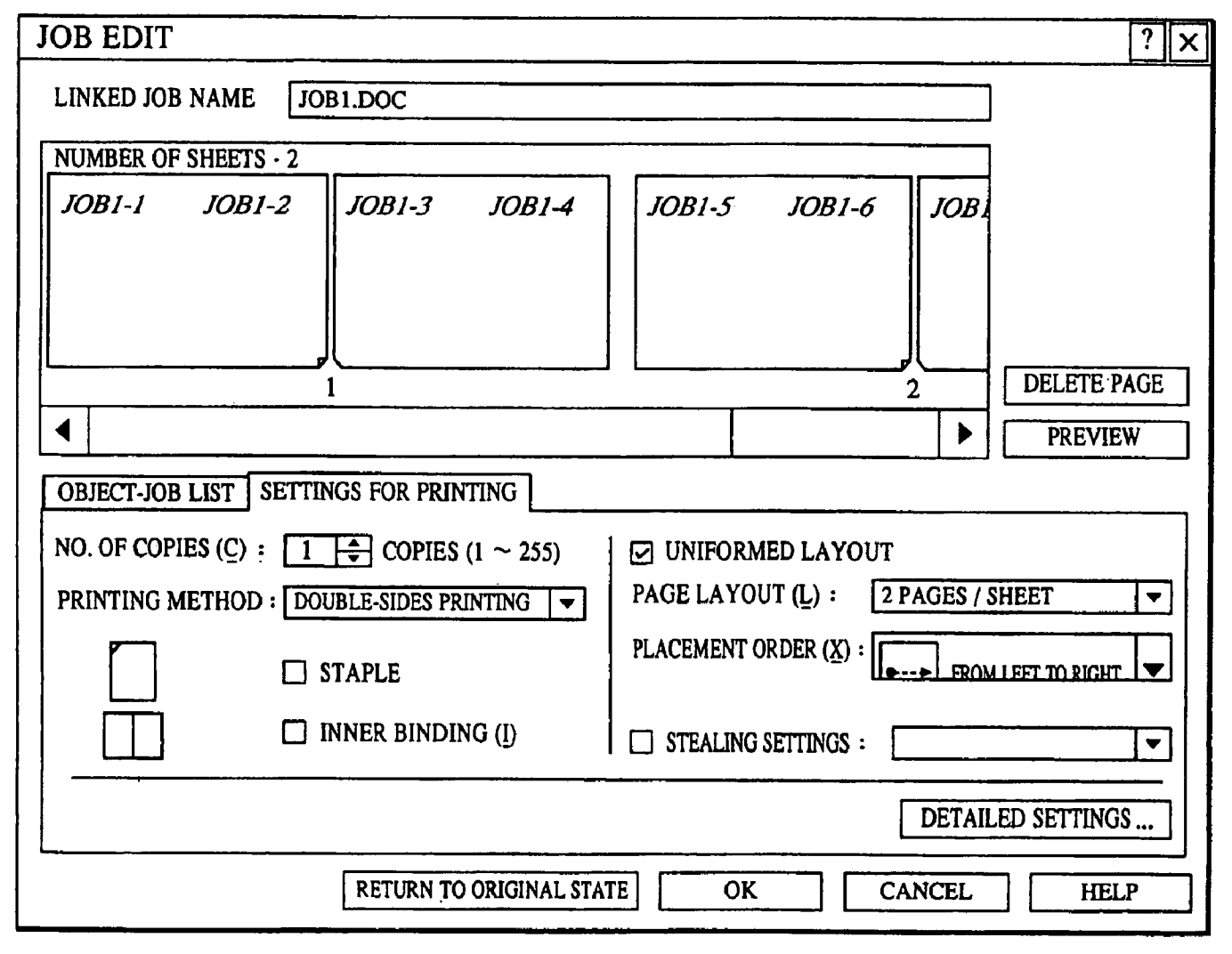

A pull-down menu 2906 is used to modify-page layouts. It allows selection of any one of "1 Page/sheet", "2 Pages/Sheet", 4 Pages/Sheet", "8 Pages/Sheet", "2×2 Posters", "3×3 Posters", and "4×4 Posters". FIG. 29 shows a preview when "1 Page/Sheet" is specified as a page layout. When the page layout is changed by selection of "2 Pages/Sheet", the screen automatically shifts to a preview screen as shown in FIG. 31. In FIG. 31, for identification of the page layout specified by selection of "2 Pages/Sheet", two logical pages are rendered on one sheet (form) (one physical page). FIG. 31 shows a case of double-sided printing, obverse and reverse faces of the logical pages are displayed; that is, totally, four logical pages are displayed.

A "Detailed Settings" button 2907 is used to modify detailed specifications. When it is pressed, a property screen controlled by the printer driver, as shown in FIG. 27, appears to allow modifications to be made for detailed specifications. After modifying the detailed specifications, pressing the "OK" button on the property screen allows modification of the small previews on the "Job Edit" screen in FIG. 29 for print specifications.

Thus, by specifying "Store" to retain the output destination of the printer driver as an intermediate file in the printer driver 303, previewing can be performed, modification can be made for the print specifications, and previews can be displayed corresponding to the modification. Therefore, usability of the system for the user is improved.

Third Embodiment

Hereinbelow, a description will be given of a third embodiment according to the present invention.

In the second embodiment, the description has been given of processing to be performed by the preview system after the number of pages are determined when printing is performed for the double-sided-printable device. In the third embodiment, however, preview processing can be implemented before the number of pages is determined.

Figure 26:
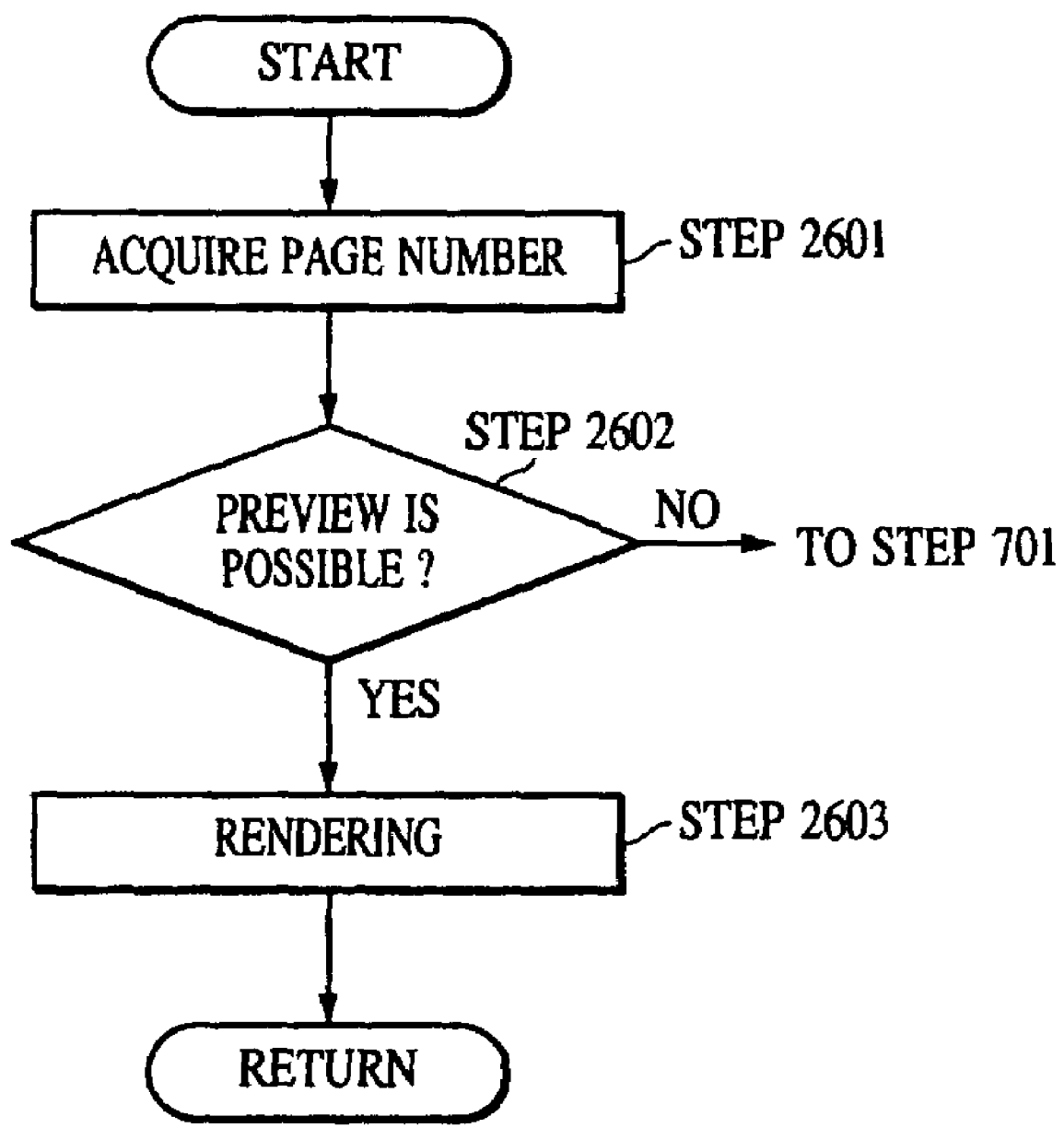
FIG. 26 is a flowchart of processing in a step shown in FIG. 7 in a third embodiment.

Specifically, to implement the aforementioned preview processing, processing as shown in FIG. 26 is performed in step 705 in FIG. 7. FIG. 26 is a flowchart of processing to be performed by the despooler 305 and the previewer 306.

In step 2602, the despooler 305 fetches data of the page number from a received print-request notification.

In step 2602, the despooler 305 fetches display specification information that was already inputted by an operator on the dialog box shown in FIG. 17. From the information, the despooler 305 determines if page numbers in the print request can be previewed. For example, in FIG. 18B, only even-number pages are rendered; therefore, the aforementioned page numbers can not be rendered, and processing is returned to step 701. Thus, if previewing cannot be performed, in step 706, print-termination notifications for two physical pages are sent out.

Except for the aforementioned case, previewing can be performed; therefore processing proceeds to step 2603.

In step 2603, the despooler 305 activates the previewer 306 and posts a page-number notification therein. In response, the previewer 306 performs preview-rendering processing of the specified pages according to the individual rendering methods of the second embodiment.

Thus, according to the above-described steps, preview processing can be implemented before the number of pages is determined.

Hereinbelow, a description will be given of advantages, modification, applicability, distribution, and the like of the present invention.

The present invention may be applied to a system configured of multiple units, such as a host computer, an interface devices, readers, and printers.

Also, the present invention may be applied to a single apparatus unit, such as a photographic copy reproduction unit, a printer, and facsimile unit.

In addition, the objects of the present invention can be achieved in an arrangement made such that a computer in a system or apparatus (or, a CPU or an MPU) reads software program codes that implements the functions of the described embodiments from a storage medium.

According to the above arrangement, the program codes read out from the storage medium implement the functions of the embodiments, thereby configuring the present invention.

As the storage medium for providing the program codes, for example, a floppy disk (FD), a hard disk, an optical disk, a CD-ROM, a CD-R, a magnetic tape, a nonvolatile memory card, and ROM may be used.

As described above, by execution of the program codes read out by the computer, the functions of the described embodiments can be implemented. In addition, an arrangement may be such that, according to instructions provided by the program codes, an operating system (OS) or the like that runs in a computer implements a part of, or all of the practical processing. This arrangement is also included in the scope of the present invention.

In addition, an arrangement may be such that the program codes read out from the storage medium are written in a memory of an enhanced function unit connected either to an enhanced function board inserted in a computer or to a computer; thereafter, a CPU or the like in the enhanced function board or the enhanced function unit implements a part of or all of practical processing according to instructions provided by the program codes. This arrangement is also included in the scope of the present invention.

In addition, in order to implement the functions and processing by using a computer, the program codes to be installed in the computer also realize the present invention. According to claims of the present invention, the computer program for implementing the functions and processing of the present invention is also included in the scope of the present invention.

To provide the computer program, in addition to the above-described way in which the FD, the CD-ROM, or the like are used to store the program, and the program codes are read out by the computer so as to be installed therein, other ways may be arranged. For example, an arrangement may be such that the program of the present invention is linked to a home page registered in the Internet by using a browser of a client computer, and either the program as provided by the present invention or a compacted program file including an auto-installation function is downloaded therefrom.

In addition, to provide the program of the present invention, an arrangement may be such that the program codes that compose the program are divided into multiple program files, and the individual program files are downloaded from different home pages registered in the Internet. In this case, a WWW server is used to allow multiple users to download the program files. The WWW server is also included in the scope of the present invention.

In addition, to implement the present invention, an arrangement may be such that the program of the present invention is encrypted, stored in a storage medium such as an FD, and distributed to users; users who satisfy predetermined conditions are permitted to download key information for decrypting the encrypted program from a home page via the Internet; and the users use the key information, execute the encrypted program; thereby allowing the users to install the program in their computer.

As described above, according to the present invention, preview screens reflecting considerations for the device information are displayed and controlled. Therefore, functions of devices and print specifications can be previewed, thereby allowing defect-free output results to be provided to the operator prior to printing.

Furthermore, according to the present invention, preview screens reflecting considerations for reverse faces in double-sided printing are displayed and controlled, thereby allowing actual output results to be provided to the operator prior to printing.

As above, while the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information-processing apparatus for displaying a preview image based on document data generated by an application, comprising:
   a setting unit constructed to set double-sided printing;
   a designation unit constructed to designate a display of the preview image;
   a data-generating unit constructed to generate an obverse face preview image based on a page to be placed on the obverse face of a sheet included in the document data and a perspective-reverse-face preview image based on a page to be placed on the reverse face of the sheet included in the document data when the double-sided printing is set by setting unit and said designation unit designates the display of the preview image; and
   a display controlling unit constructed to display a merged preview image based on the obverse face preview image and the perspective-reverse-face preview image;
   wherein said display controlling unit displays the merged preview image so that the perspective-reverse-face preview image is recognizable as the image of the reverse face of the sheet.

2. The information-processing apparatus according to claim 1, further comprising a specification unit for specifying whether perspective-reverse faces are previewed or only obverse faces are displayed when previewing is performed for the document data for which the specification is set,
   wherein, when said specification unit specifies that only the obverse faces are displayed, said data-generating unit generates the obverse face preview image for pages to be placed on the obverse face of the sheet.

3. The information-processing apparatus according to claim 2, wherein said specification unit specifies one of an even-number page and an odd-number page to be an obverse face, and said data-generating unit generates the obverse face preview image by assuming the specified page to be the obverse face.

4. The information-processing apparatus according to claim 1, further comprising a spooling unit for receiving the document data via a rendering unit controlled by an operating system and retaining the document data as intermediate data, wherein said data-generating unit generates rendering data from the intermediate data retained by said spooling unit and re-outputs the rendering data to said rendering unit.

5. The information-processing apparatus according to claim 4, further comprising a print-data generating unit for converting the rendering data inputted via said rendering unit controlled by said operating system to print-data that can be interpreted by said printer.

6. The information-processing apparatus according to claim 5, further comprising a transmitting unit for transmitting the print-data to said printer via a network, the print-data having been converted and generated by said print-data generating unit.

7. The information-processing apparatus according to claim 6, wherein the previewing can be started before spooling of all logical pages.

8. An information-processing method of displaying a preview image based on document data generated by an application, comprising:
   a setting step of setting double-sided printing;
   a designating step of designating a display of the preview image;
   a data-generating step of generating an obverse face preview image based on a page to be placed on the obverse face of a sheet included in the document data and a perspective-reverse-face preview image based on a page to be placed on the reverse face of the sheet included in the document data when the double-sided printing is set by setting step and said designation step designates to display the preview image; and a display controlling step of displaying a merged preview image based on the obverse face preview image and the perspective-reverse-face preview image;

wherein said displaying controlling step displays the merged preview image so that the perspective-reverse-face preview image is recognizable as the image of the reverse face of the sheet.

9. The information-processing method according to claim 8, further comprising a specification step of specifying whether perspective-reverse faces are previewed or only obverse faces are displayed when previewing is performed for the document data for which the specification is set, wherein, when said specification step specifies that only the obverse faces are displayed, said data-generating step generates the obverse face preview image for pages to be placed on the obverse face of the sheet.

10. The information-processing method according to claim 9, wherein said specification step specifies one of an even-number page and an odd-number page to be an obverse face, and said data-generating step generates the obverse face preview image by assuming the specified page to be the obverse face.

11. The information-processing method according to claim 8, further comprising a spooling step of receiving the document data via a rendering step controlled by an operating system and retaining the document data as intermediate data, wherein said data-generating step generates rendering data from the intermediate data retained by said spooling step and re-outputs the rendering data to said rendering step.

12. The information-processing method according to claim 11, further comprising a print-data generating step of converting the rendering data inputted via said rendering step controlled by said operating system to print-data that can be interpreted by said printer.

13. The information-processing method according to claim 12, further comprising a transmitting step of transmitting the print-data to said printer via a network, the print-data having been converted and generated in the print-data generating step.

14. The information-processing method according to claim 13, wherein the previewing can be started before spooling of all logical pages.

15. A computer-readable storage medium containing a computer-executable program for displaying a preview image based on document data generated by an application, comprising:

setting program code for setting double-sided printing;

designation program code for designating a display of the preview image;

data-generating program code for generating an obverse face preview image based on a page to be placed on the obverse face of a sheet included in the document data and a perspective-reverse-face preview image based on a page to be placed on the reverse face of the sheet included in the document data when the double-sided printing is set by said setting program code and said designation program designates to display the preview image; and display controlling program code for displaying a merged preview image based on the obverse face preview image and the perspective-reverse-face preview image;

wherein said display controlling program code displays the merged preview image that the perspective-reverse-face preview image is recognizable as the image of the reverse face of the sheet.

16. A computer-readable storage medium according to claim 15, further comprising specification program code for specifying whether perspective-reverse faces are previewed or only obverse faces are displayed when previewing is performed for the document data for which the specification is set, wherein, when said specification program code specifies that only the obverse faces are displayed, said data-generating program code generates the obverse face preview image for pages to be placed on the obverse face of the sheet.

17. The computer-readable storage medium according to claim 16, wherein said specification program code specifies one of an even-number page and an odd-number page to be an obverse face, and said data-generating program code generates the obverse face preview image by assuming the specified page to be the obverse face.

18. The computer-readable storage medium according to claim 15, further comprising a spooling program code for receiving the document data via rendering program code controlled by an operating system and retaining the document data as intermediate data, wherein said data-generating program code generates rendering data from the intermediate data retained by said spooling program code and re-outputs the rendering data to said rendering program code.

19. The computer-readable storage medium according to claim 18, further comprising print data generating program code for converting the rendering data inputted via said rendering program code controlled by said operating system to print-data that can be interpreted by said printer.

20. The computer-readable storage medium according to claim 19, further comprising a transmitting program code for transmitting the print-data to said printer via a network, the print-data having been converted and generated by the print-data generating program code.

21. The computer-readable storage medium according to claim 20, wherein the previewing can be started before spooling of all logical pages.

22. The information-processing apparatus according to claim 1, wherein said display controlling unit displays the merged preview image on which the perspective-reverse-face preview image is reversed.

* * * * *